United States Patent
Matsumoto et al.

(10) Patent No.: US 7,226,644 B2
(45) Date of Patent: Jun. 5, 2007

(54) CHROMAN DERIVATIVE AND LIQUID-CRYSTAL COMPOSITION CONTAINING THE COMPOUND

(75) Inventors: Takashi Matsumoto, Saitama (JP); Tetsuo Kusumoto, Ageo (JP); Shotaro Kawakami, Oosato-gun (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/562,644

(22) PCT Filed: Jun. 25, 2004

(86) PCT No.: PCT/JP2004/009397

§ 371 (c)(1),
(2), (4) Date: Dec. 28, 2005

(87) PCT Pub. No.: WO2005/000995

PCT Pub. Date: Jan. 6, 2005

(65) Prior Publication Data

US 2006/0163536 A1 Jul. 27, 2006

(30) Foreign Application Priority Data

Jun. 30, 2003 (JP) .............................. 2003-186941
Mar. 12, 2004 (JP) .............................. 2004-070573

(51) Int. Cl.
C09K 19/34 (2006.01)
C09K 19/32 (2006.01)
C09K 19/30 (2006.01)
C09K 19/12 (2006.01)
C09K 19/20 (2006.01)
C07D 311/04 (2006.01)
C07D 311/76 (2006.01)

(52) U.S. Cl. ............. 428/1.3; 252/299.01; 252/299.61; 252/299.62; 252/299.63; 252/299.66; 252/299.67; 549/399; 549/400; 549/401; 549/403; 549/405; 549/406; 549/408

(58) Field of Classification Search .......... 252/299.01, 252/299.61, 299.62, 299.63, 299.67, 299.66; 428/1.1, 1.3; 549/402, 469, 399, 400, 401, 549/403, 405, 406, 408
See application file for complete search history.

(56) References Cited

U.S. PATENT DOCUMENTS

2005/0247910 A1* 11/2005 Sugiura et al. ........ 252/299.61

FOREIGN PATENT DOCUMENTS

| DE | 39 06 019 A1 | 9/1989 |
| DE | 195 22 145 A1 | 12/1995 |
| DE | 195 22 195 A1 | 12/1995 |
| EP | 1491612 | * 12/2004 |
| JP | 5-25158 | 2/1993 |
| JP | 6-256337 | 9/1994 |
| JP | 6-256339 | 9/1994 |
| JP | 2001-40355 | 2/2001 |
| JP | 2002-69449 | 3/2002 |
| JP | 2002-532613 | 10/2002 |
| WO | 00/36054 A1 | 6/2000 |

* cited by examiner

Primary Examiner—Shean C Wu
(74) Attorney, Agent, or Firm—Armstrong Kratz Quintos Hanson & Brooks, LLP

(57) ABSTRACT

The present invention relates to a liquid crystal compound which has negative dielectric anisotropy and a large absolute value thereof; and a liquid crystal display element which contains the compound as a constituent element and has a negative value of dielectric anisotropy in the vertical alignment mode, IPS, or the like. The liquid-crystal display element has a structure including a pair of substrates and a liquid crystal sandwiched therebetween, and includes at least an alignment control layer, a transparent electrode, and a polarizing plate, in which the liquid crystal includes at least one compound having a partial structure represented by general formula (A):

(A)

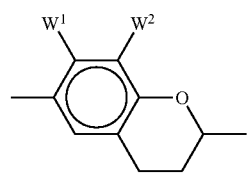

(wherein $W^1$ and $W^2$ each independently represents fluorine, chlorine, $-CF_3$, $-CF_2H$, $-OCF_3$, or $-OCF_2H$) and has negative dielectric anistropy.

18 Claims, 3 Drawing Sheets

CHROMAN DERIVATIVE AND LIQUID-CRYSTAL COMPOSITION CONTAINING THE COMPOUND

TECHNICAL FIELD

The present invention relates to a chroman derivative, a liquid crystal composition using this, and a liquid crystal display element using this.

Priority is claimed on Japanese Patent Application No. 2003-186941, filed Jun. 30, 2003, and Japanese Patent Application No. 2004-70573, filed Mar. 12, 2004, the content of which is incorporated herein by reference.

BACKGROUND ART

At present, liquid crystal display elements are now widely used due to their excellent characteristics such as low voltage actuation, thin model display, or the like. Examples of the display systems of conventional liquid crystal display elements, particularly small-to-medium-sized elements, include TN (twisted nematic), STN (super twisted nematic), active matrix based on TN (TFT: thin film transistor), and the like, and they utilize liquid crystal compositions having positive dielectric anisotropy values.

However, these display systems have a narrow viewing angle as one of their defects, and an improvement thereof has become a major issue in accordance with the currently increasing demand for larger liquid crystal panels. As a solution to this, display systems such as vertical alignment mode, IPS (In Plane Switching), and the like have recently been newly put to practical use. The vertical alignment mode is a system to improve the viewing angle by utilizing vertical alignment of liquid crystal molecules, in which a liquid crystal composition having a negative dielectric anisotropy value is used. IPS is a system to improve the viewing angle by switching liquid crystal molecules using a horizontal electric field in parallel with glass substrates, in which a liquid crystal composition having a positive or negative dielectric anisotropy value is used. Thus, the vertical alignment mode and IPS, which are display systems effective for improving the viewing angle, require liquid crystal compounds and liquid crystal compositions having negative dielectric anisotropy values, which have become strongly demanded. However, liquid crystal compounds or liquid crystal compositions having negative dielectric anisotropy values have not been sufficiently developed, because conventional display systems mainly use liquid crystal compositions having positive dielectric anisotropy values as described above.

As a liquid crystal compound having a negative dielectric anisotropy value, a liquid crystal compound having a 2,3-difluorophenylene skeleton (see Patent Document 1) and a liquid crystal compound having a 3,4-difluoro-5,6,7,8-tetrahydronaphthalene skeleton (see Patent Document 2) are disclosed. However, the absolute values of the dielectric anisotropy values of these compounds are not necessarily sufficiently large, which prevents the progress of the development of liquid crystal display elements, so a compound having a large absolute value of negative dielectric anisotropy value is required to be developed.

As a compound having a large absolute value of dielectric anisotropy, a liquid crystal compound having a 1,7,8-trifluoronaphthalene skeleton is disclosed (see Patent Document 3). However, although this compound has a large absolute value of the dielectric anisotropy, the refractive index anisotropy thereof is large because the compound has a naphthalene skeleton. Therefore, it is difficult to apply the compound to a liquid crystal composition having a small refractive index anisotropy.

On the other hand, application of a compound having a chroman ring to a liquid crystal material has already been known (see Patent Documents 4 and 5). However, the compounds described in these documents are intended to be used for ferroelectric liquid crystal compositions, because the compounds have an unsubstituted chromam ring as well as an optically-active group. Moreover, there is no disclosure with respect to negative dielectric anisotropy in these documents. Also, chroman-based compounds which are intended for conventional nematic liquid crystal compositions and in which an optically-active group is not essential are known (see Patent Document 6). However, the described compounds are compounds each having an unsubstituted chroman ring, and seem to be intended for ferroelectric liquid crystal compositions. Moreover, most of the compounds have positive dielectric anisotropy, and compounds having negative dielectric anisotropy are not disclosed.

As mentioned above, a liquid crystal material having a large absolute value of negative dielectric anisotropy and small refractive index anisotropy has been required to be developed.

(Patent Document 1) German Laid-Open Patent Application No. 3906019

(Patent Document 2) German Laid-Open Patent Application No. 19522145

(Patent Document 3) German Laid-Open Patent Application No. 19522195

(Patent Document 4) Japanese Laid-Open Patent Application No. Hei 5-25158

(Patent Document 5) Japanese Laid-Open Patent Application No. Hei 6-256337

(Patent Document 6) Japanese Laid-Open Patent Application No. Hei 6-256339

DISCLOSURE OF INVENTION

An object of the present invention is to provide a liquid crystal compound having negative dielectric anisotropy, a large absolute value thereof, and small refractive index anisotropy, a liquid crystal composition containing the compound, and a liquid crystal display element containing the composition.

As a result of examination with respect to various liquid crystal materials so as to solve the above-mentioned problems, the inventors of the present invention have completed the following invention.

The present invention provides a liquid crystal display element having a structure comprising: a pair of substrates; and a liquid crystal sandwiched therebetween; and including at least: an alignment control layer (including an alignment film); a transparent electrode; and a polarizing plate, which is characterized in that the liquid crystal contains at least one liquid crystal compound having a partial structure represented by general formula (A):

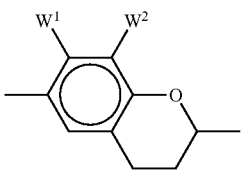

(A)

(wherein $W^1$ and $W^2$ each independently represents fluorine, chlorine, —$CF_3$, —$CF_2H$, —$OCF_3$, or —$OCF_2H$) and has a negative dielectric anistropy, and a chroman derivative represented by general formula (1):

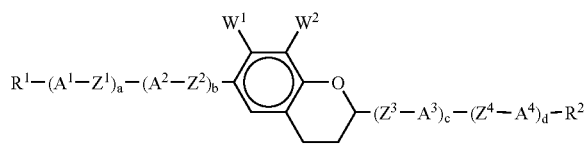

(1)

(wherein $R^1$ and $R^2$ each independently represents hydrogen, an alkyl group having 1 to 12 carbon atoms or an alkenyl group having 2 to 12 carbon atoms, in which one $CH_2$ group or at least two $CH_2$ groups that are not adjacent to each other may be substituted by oxygen or sulfur, or in which at least one hydrogen may be substitued by fluorine or chlorine, $A^1$, $A^2$, $A^3$, and $A^4$ each independently represents a trans-1,4-cyclohexylene group (in which one $CH_2$ group or two $CH_2$ groups that are not adjacent to each other may be substituted by oxygen or sulfur), 1,4-phenylene group (in which at least one CH group may be substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group or 1,2,3,4-tetrahydronaphthalene-2,6-diyl group, in which hydrogen may be substituted by —CN or a halogen, $Z^1$, $Z^2$, $Z^3$, and $Z^4$ each independently represents —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO, =COS, —SCO—, or a single bond, when $A^1$, $A^2$, $A^3$, $A^4$, $Z^1$, $Z^2$, $Z^3$, and $Z^4$ respectively exist in plural, they may be identical to each other or different from each other, a, b, c, and d each independently represents 0 or 1, and $W^1$ and $W^2$ each independently represents fluorine, chlorine, —$CF_3$, —$CF_2H$, —$OCF_3$, or —$OCF_2H$), and a liquid crystal composition containing the derivative.

The chroman derivative of the present invention has characteristics in which the dielectric anisotropy is negative, the absolute value thereof is large, and the anisotropy of the refractive index is small. The liquid crystal composition and the liquid crystal display element, which include the compound as their constituent, are useful as liquid crystal display elements of a vertical alignment mode, IPS mode, or the like.

BEST MODE FOR CARRYING OUT THE INVENTION

Figure 1:
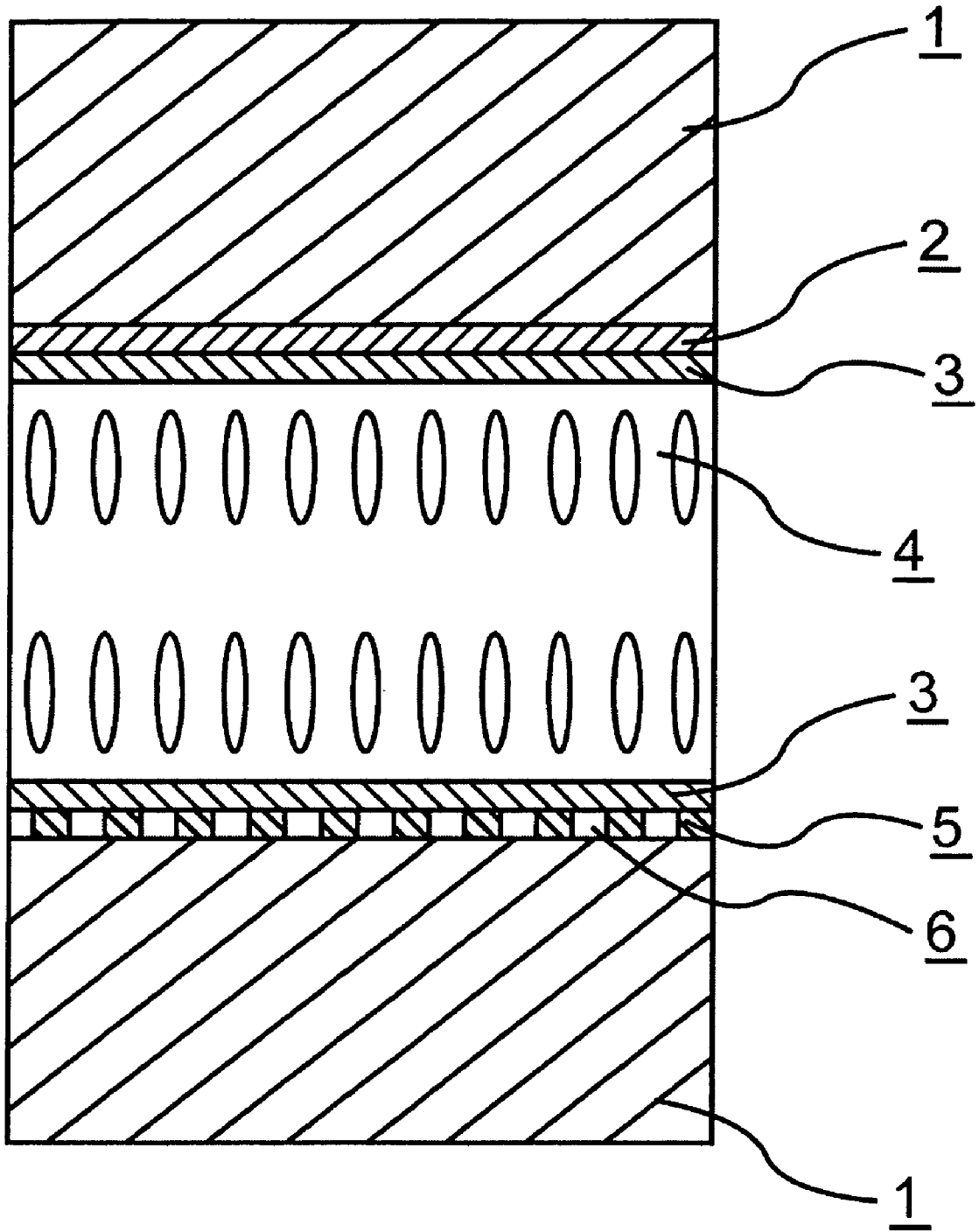
FIG. 1 is a cross-sectional view showing a liquid crystal display device having VA mode display characteristics.

In the following, an embodiment of the present invention will be explained. However, the present invention is not intended to be limited by the following examples, and, for example, constituents of the examples may be appropriately combined.

Although a liquid crystal display element of the present invention is characterized in that a liquid crystal layer provided between a pair of substrates contains a liquid crystal compound having a structure represented by general formula (A), it is preferable to contain a liquid crystal compound having a structure represented by general formula (A) in which $W^1$ and $W^2$ represent fluorine.

It is preferable that the liquid crystal display element of the present invention be particulary used as an active matrix liquid crystal display element, and that the display mode thereof be a VA (Vertically aligned) mode, IPS (In-Plane Switching) mode, or ECB (electrically controlled birefringence) mode so as to obtain wider viewing angle.

Although the compound represented by general formula (1) includes many compounds, the following compounds are preferable.

It is preferable that in general formula (1) $R^1$ and $R^2$ each independently represents an alkyl group having 1 to 12 carbon atoms, an alkenyl group having 2 to 12 carbon atoms, an alkoxy group having 1 to 12 carbon atoms, an alkyl group having 1 to 7 carbon atoms which is substituted by an alkoxy group having 1 to 5 carbon atoms, or an alkenyl group having 2 to 7 carbon atoms which is substituted by an alkoxy group having 1 to 5 carbon atoms, and more preferably represents an alkyl group having 1 to 12 carbon atoms, or an alkenyl group having 2 to 12 carbon atoms, and specifically represents —$CH_3$, —$CH_2CH_3$, —$(CH_2)_2CH_3$, —$(CH_2)_3CH_3$, —$(CH_2)_4CH_3$, —$(CH_2)_5CH_3$, —$(CH_2)_6CH_3$, —$(CH_2)_7 CH_3$, —CH=$CH_2$, —CH=$CHCH_3$ (E form), —$(CH_2)_2$ CH=$CH_2$, —$(CH_2)_2$CH=$CHCH_3$ (E form), —$(CH_2)_4$ CH=$CH_2$, —$(CH_2)_4$CH=$CHCH_3$ (E form), —$OCH_3$, —$OCH_2CH_3$, —$O(CH_2)_2CH_3$, —$O(CH_2)_3CH_3$, or —$O(CH_2)_4CH_3$, and particularly preferably represents —$CH_3$, —$CH_2CH_3$, —$(CH_2)_2CH_3$, —$(CH_2)_3CH_3$, —$(CH_2)_4$ $CH_3$, —$(CH_2)_5CH_3$, —$(CH_2)_6CH_3$, —$(CH_2)_7$ $CH_3$, —$(CH_2)_2$CH=$CH_2$, —$(CH_2)_2$CH=$CHCH_3$ (E form), —$(CH_2)_4$CH=$CH_2$, —$(CH_2)_4$CH=$CHCH_3$ (E form), —$OCH_3$, —$OCH_2CH_3$, —$O(CH_2)_2CH_3$, —$O(CH_2)_3$ $CH_3$, or —$O(CH_2)_4CH_3$, when a ring to be substituted is an aromatic ring.

Among them, it is preferable that $R^1$ or $R^2$ substituted at the 6-position of a chroman ring represents an alkoxy group since it increases dielectric anisotropy.

$A^1$, $A^2$, $A^3$ and $A^4$ each independently preferably represents a trans-1,4-cyclohexylene group (including one in which one $CH_2$ group or two $CH_2$ groups that are not adjacent to each other are substituted by oxygen), 1,4-phenylene group (including one in which one or two CH group(s) is(are) substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group, 1,2,3,4-tetrahydronaphthalene-2,6-diyl group, or a substituent in which hydrogen of the above-mentioned group is substituted by fluorine, and more preferably represents a trans-1,4-cyclohexylene group, 1,4-phenylene group, 2-fluoro-1,4-phenylene group, 3-fluoro-1,4-phenylene group, 2,3-difluoro-1,4-phenylene group, or 1,4-bicyclo[2.2.2]octylene group, and even more preferably represents a trans-1,4-cyclohexylene group, 1,4-phenylene group, 2-fluoro-1,4-phenylene group, 3-fluoro-1,4-phenylene group, or 2,3-difluoro-1,4-phenylene group, and particularly preferably represents a trans-1,4-cyclohexylene group or 1,4-phenylene group.

$Z^1$, $Z^2$, $Z^3$ and $Z^4$ each independently preferably represents —$CH_2CH_2$—, —CH=CH— (E form), —CH($CH_3$)$CH_2$—, —$CH_2$CH($CH_3$)—, —$CF_2CF_2$—, —CF=CF— (E form), —$CH_2$O—, —O$CH_2$—, —OCH($CH_3$)—, —CH($CH_3$)O—, —$(CH_2)_4$—, —C≡C—, —$CF_2$O—, —O$CF_2$—, —COO—, —OCO—, or a single bond, and more preferably represents —$CH_2CH_2$—, —CH=CH— (E form), —CH($CH_3$)$CH_2$—, —$CH_2$CH($CH_3$)—, —$CF_2CF_2$—, —CF=CF— (E form), —$CH_2$O—, —O$CH_2$—, —OCH($CH_3$)—, —CH($CH_3$)O—, —C≡C—, —$CF_2$O—, —O$CF_2$— or a single bond, and even more preferably represents —$CH_2CH_2$—, —$CH_2$O—, —O$CH_2$—, —$CF_2$O—, —O$CF_2$—, —CH=CH— (E form) or a single bond, and particularly preferably represents —$CH_2CH_2$—, —$CH_2$O—, —O$CH_2$— or a single bond.

Among them, a compound in which $Z^1$ or $Z^2$ substituted at the 6-position of a chroman ring is —$CH_2$O—, —O$CH_2$—, —O$CF_2$— or —$CF_2$O— in which oxygen binds to the chroman ring has a significantly large absolute negative dielectric anisotropy value.

It is preferable that $W^1$ and $W^2$ each independently represents fluorine, chlorine, —$CF_3$, —$CF_2$H, —$OCF_3$ or —$OCF_2$H, and more preferably represents fluorine or chlorine, and particularly preferably represents fluorine.

Although a, b, c, and d each independently represents 0 or 1, it is preferable that the sum of a, b, c, and d is no less than 1 and no more than 3, and more preferably no less than 1 and no more than 2.

In more detail, among the compounds represented by general formula (1), as particularly preferable compounds, compounds shown in formula group (1) can be mentioned.

Formula Group (1)

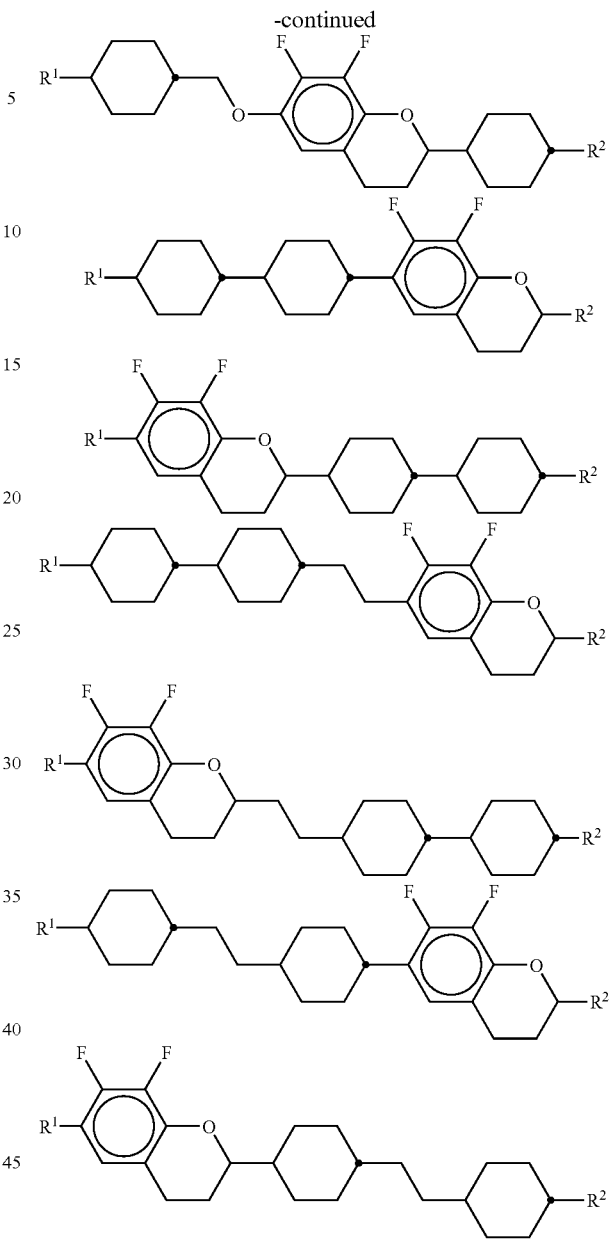

-continued

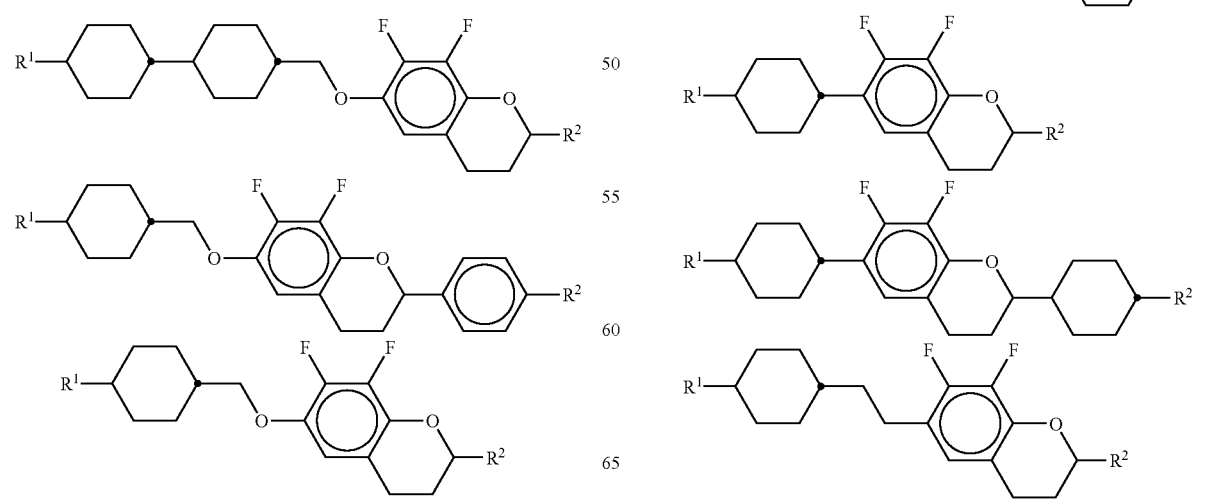

-continued

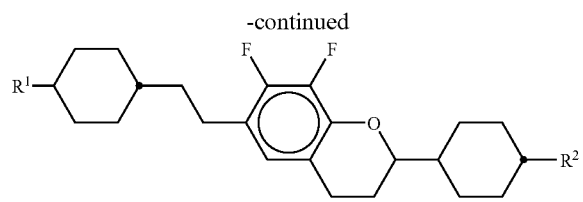

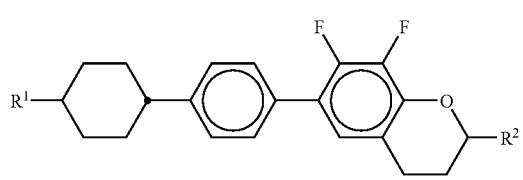

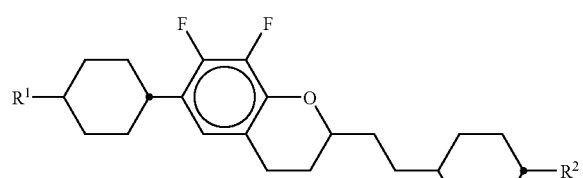

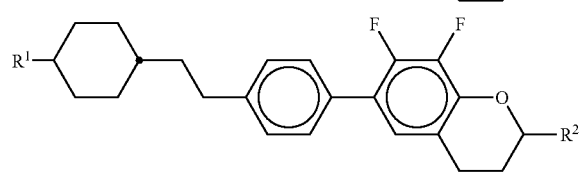

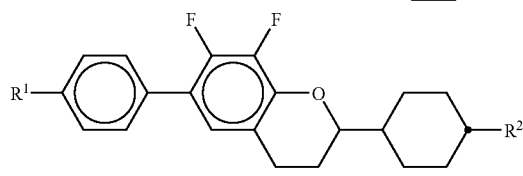

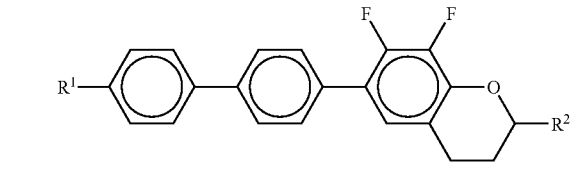

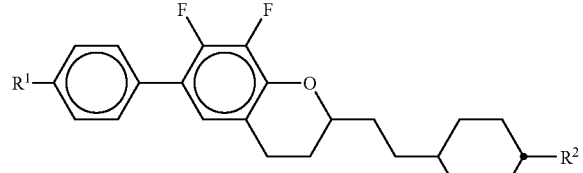

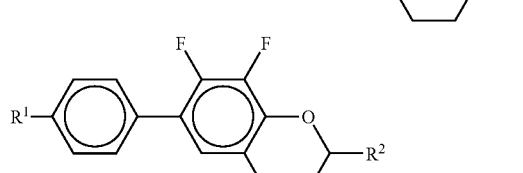

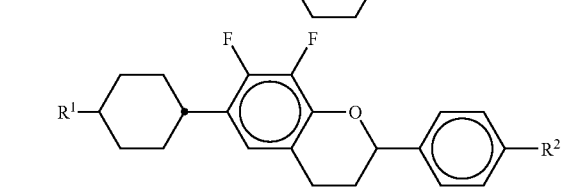

-continued

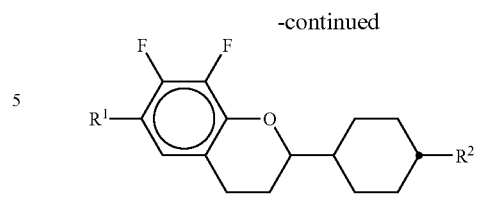

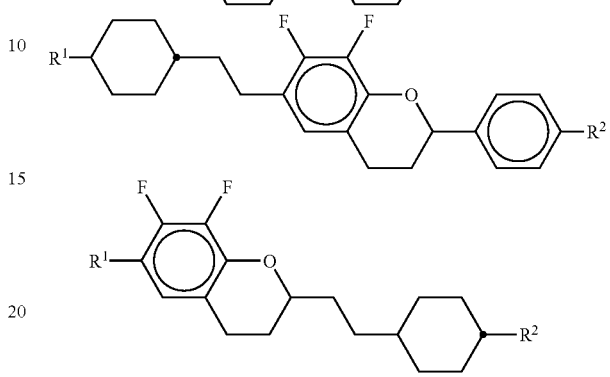

(In the formulae, $R^1$ and $R^2$ each independently represents —$CH_3$, —$CH_2CH_3$, —$(CH_2)_2C$ —$(CH_2)_3CH_3$, —$(CH_2)_4CH_3$, —$(CH_2)_5CH_3$, —$(CH_2)_6CH_3$, —$(CH_2)_7CH_3$, —$CH=CH_2$, —$CH=CHCH_3$ (E form), —$(CH_2)_2CH=CH_2$, —$(CH_2)_2CH=CHCH_3$ (E form), —$(CH_2)_4CH=CH_2$, —$(CH_2)_4CH=CHCH_3$ (E form), —$OCH_3$, —$OCH_2CH_3$, —$O(CH_2)_2CH_3$, —$O(CH_2)_3CH_3$ or —$O(CH_2)_4CH_3$.)

The compounds represented by general formula (1) can be produced according to the following methods.

(Preparation Method 1)

Into a benzene ring of a benzene derivative represented by general formula (12)

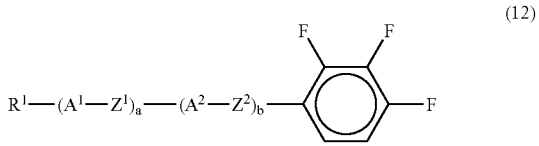

(12)

(wherein $R^1$, $A^1$, $A^2$, $Z^1$, $Z^2$, a, and b each independently represents the same meaning as that of general formula (1)), a halogen group is introduced to produce a benzene derivative represented by general formula (13)

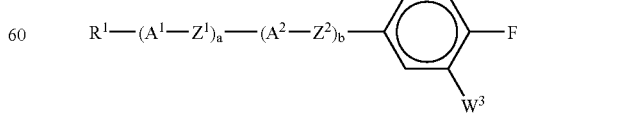

(13)

(wherein $R^1$, $A^1$, $A^2$, $Z^1$, $Z^2$, a, and b each independently represents the same meaning as that of general formula (1), and $W^3$ represents halogen). In such a case, $W^3$ preferably is chlorine, bromine, or iodine, and more preferably iodine.

With the produced compound represented by general formula (13), an acetylene derivative represented by general formula (14)

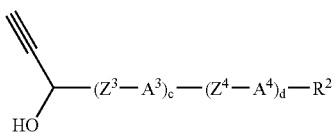
(14)

(wherein $R^2$, $A^3$, $A^4$, $Z^3$, $Z^4$, c, and d each independently represents the same meaning as that of general formula (1)) is coupling-reacted to produce an acetylene derivative represented by general formula (15)

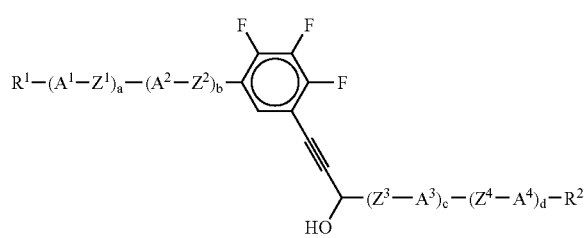
(15)

(wherein $R^1$, $R^2$, $A^1$, $A^2$, $A^3$, $A^4$, $Z^1$, $Z^2$, $Z^3$, $Z^4$, a, b, c, and d each independently represents the same meaning as that of general formula (1)).

The produced compound represented by general formula (15) is hydrogenated to produce an alcohol derivative represented by general formula (16)

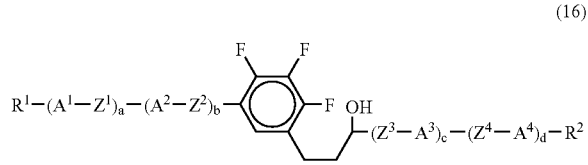
(16)

(wherein $R^1$, $R^2$, $A^1$, $A^2$, $A^3$, $A^4$, $Z^1$, $Z^2$, $Z^3$, $Z^4$, a, b, c, and d each independently represents the same meaning as that of general formula (1)).

The produced compound represented by general formula (16) is reacted with a base to produce an alcoholate represented by general formula (17)

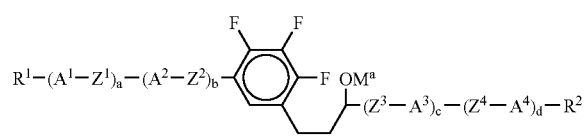
(17)

(wherein $R^1$, $R^2$, $A^2$, $A^3$, $A^4$, $Z^1$, $Z^2$, $Z^3$, $Z^4$, a, b, c, and d each independently represents the same meaning as that of general formula (1), and $M^a$ represents an alkali metal such as lithium, sodium, potassium or the like, an alkaline earth metal such as magnesium, calcium, or the like). Preferable examples of the base include metal hydrides, metal carbonates, metal hydroxides, metal carboxylates, metal amides, metals, and the like. Among them, alkali metal hydrides, alkali metal carbonates, alkali metal hydroxides, alkali metal amides, and alkali metals are preferable, and alkali metal hydrides and alkali metal carbonates are more preferable. Preferable examples of alkali metal hydrides include lithium hydride, sodium hydride, and potassium hydride, and preferable examples of alkali metal carbonates include sodium carbonate, sodium hydrogencarbonate, potassium carbonate, and potassium hydrogencarbonate.

In such a case, although any solvents can be used provided that they enable the reaction to proceed preferably, ether solvents, hydrocarbon solvents, aromatic solvents, polar solvents, or the like can be preferably used. Preferable examples of the ether solvents include 1,4-dioxane, 1,3-dioxane, tetrahydrofuran, diethylether, t-butylmethylether, and the like. Preferable examples of chlorine solvents include dichloromethane, 1,2-dichloroethane, carbon tetrachloride, and the like. Preferable examples of the hydrocarbon solvents include pentane, hexane, cyclohexane, heptane, octane, and the like. Preferable examples of the aromatic solvents include benzene, toluene, xylene, mesitylene, chlorobenzene, dichlorobenzene, and the like. Preferable examples of the polar solvents include N,N-dimethylformamide, N-methylpyrrolidone, dimethylsulfoxide, sulfolane, and the like. Among them, the ether solvents such as tetrahydrofuran, dimethylether, and the like, and the polar solvents such as N,N-dimethylformamide and the like are more preferable. The above-mentioned solvents may be used singularly or in combination of two or more.

The reaction temperature may be set between a range of a melting point to a reflux temperature of the solvent, and is preferably −20° C. to 60° C.

The produced compound represented by general formula (17) is intramolecular-substituted to produce a chroman derivative represented by general formula (18)

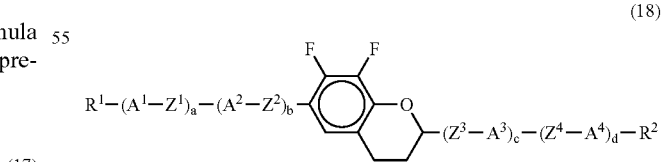
(18)

(wherein $R^1$, $R^2$, $A^1$, $A^2$, $A^3$, $A^4$, $Z^1$, $Z^2$, $Z^3$, $Z^4$, a, b, c, and d each independently represents the same meaning as that of general formula (1)). It is preferable that the reaction be carried out in the same system as that used for the reaction in which the alcoholate is produced.

(Preparation Method 2)

A chroman derivative represented by general formula (19)

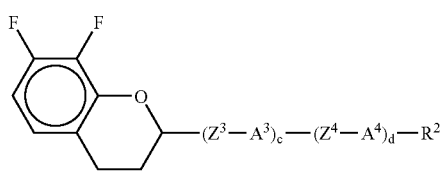
(19)

(wherein $R^2$, $A^3$, $A^4$, $Z^3$, $Z^4$, c, and d each independently represents the same meaning as that of general formula (1)) is produced by using 1,2,3-trifluorobenzene as a starting material in a similar manner to the reaction of Example 1.

The produced compound of general formula (19) is lithiated to produce a lithium compound represented by general formula (20)

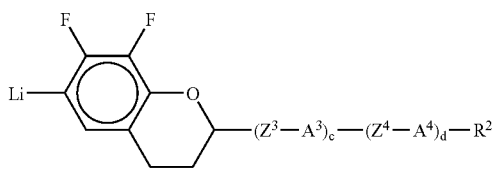
(20)

(wherein $R^2$, $A^3$, $A^4$, $Z^3$, $Z^4$, c, and d each independently represents general formula (1)).

The produced compound of general formula (20) is reacted with a cyclohexanone derivative represented by general formula (21)

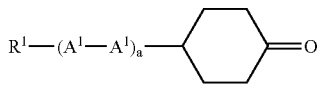
(21)

(wherein $R^1$, $A^1$, $Z^1$, and a each independently represents the same meaning as that of general formula (1)) to produce an alcohol represented by general formula (22)

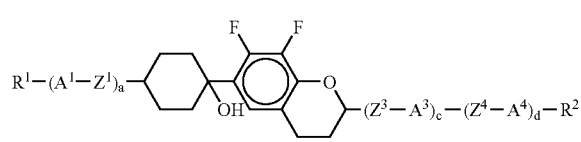
(22)

(wherein $R^1$, $R^2$, $A^1$, $A^3$, $A^4$, $Z^1$, $Z^3$, $Z^4$, a, c, and d each independently represents the same meaning as that of general formula (1)).

The produced compound of general formula (22) is dehydrated to produce an olefin represented by general formula (23)

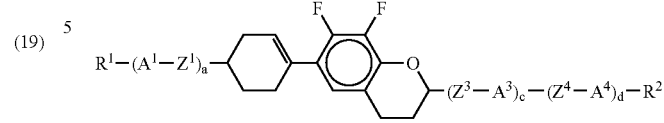
(23)

(wherein $R^1$, $R^2$, $A^1$, $A^3$, $A^4$, $Z^1$, $Z^3$, $Z^4$, a, c, and d each independently represents the same meaning as that of general formula (1)).

The produced compound of general formula (23) is hydrogenated to produce a chroman derivative represented by general formula (24)

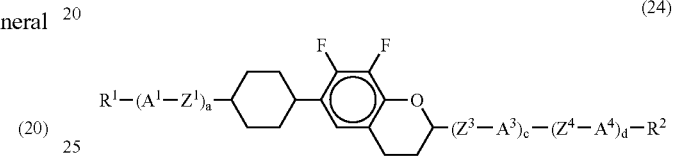
(24)

(wherein $R^1$, $R^2$, $A^1$, $A^3$, $A^4$, $Z^1$, $Z^3$, $Z^4$, a, c, and d each independently represents the same meaning as that of general formula (1)).

(Preparation Method 3)

The compound of general formula (19) is oxidized to produce a chroman derivative represented by general formula (25)

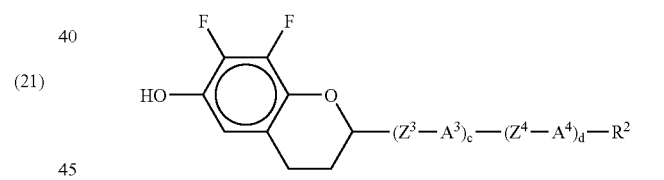
(25)

(wherein $R^2$, $A^3$, $A^4$, $Z^3$, $Z^4$, c, and d each independently represents the same meaning as that of general formula (1)).

The produced compound of general formula (25) is reacted with a base to produce a chroman derivative represented by general formula (26)

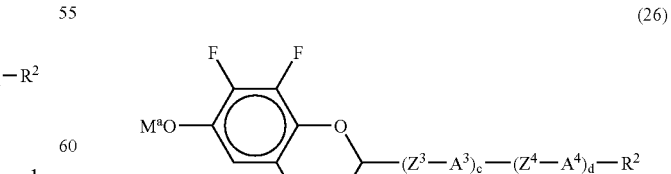
(26)

(wherein $M^a$, $R^2$, $A^3$, $A^4$, $Z^3$, $Z^4$, c, and d each independently represents the same meaning as that of general formula (17)).

The produced compound of general formula (26) is reacted with a compound represented by general formula (27)

 (27)

(wherein $R^1$, $A^1$, $A^2$, $Z^1$, and a each independently represents the same meaning as that of general formula (1), and $X^a$ represents a chlorine, bromine, iodine, benzenesulfonyl group, p-toluenesulfonyl group, methanesulfonyl group, or trifluoromethanesulfonyl group) to produce a chroman derivative represented by general formula (28)

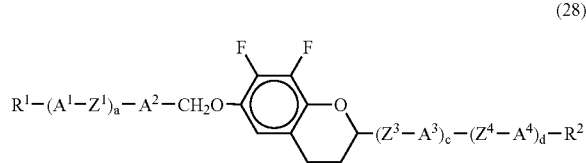

(28)

(wherein $R^1$, $R^2$, $A^1$, $A^2$, $A^3$, $A^4$, $Z^1$, $Z^3$, $Z^4$, a, c, and d each independently represents the same meaning as that of general formula (17)).

Moreover, the compound represented by general formula (15) can be produced by the following method.

(Preparation Method 4)

The compound represented by general formula (13) and 3-methyl-1-butyne-3-ol are coupling-reacted to produce a compound represented by general formula (29)

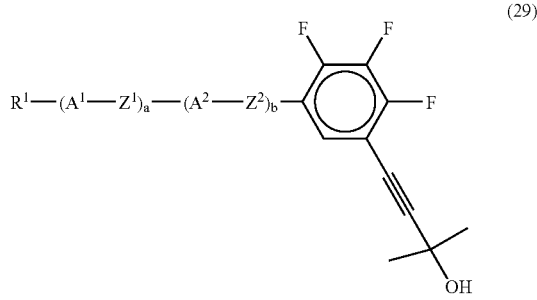

(29)

(wherein $R^1$, $A^1$, $A^2$, $Z^1$, $Z^2$, a, and b each independently represents the same meaning as that of general formula (1)).

The produced compound represented by general formula (29) is reacted with a base to produce a compound represented by general formula (30)

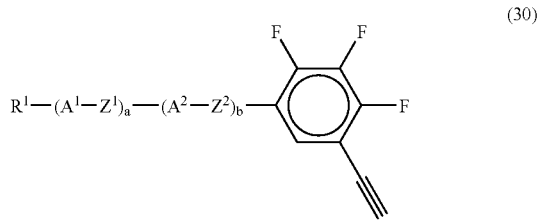

(30)

(wherein $R^1$, $A^1$, $A^2$, $Z^1$, $Z^2$, a, and b each independently represents the same meaning as that of general formula (1)).

Preferable examples of the base used above are the same as those used for producing the alcoholate of general formula (17).

An acetylide of the produced compound represented by general formula (30) is prepared, and is then reacted with an aldehyde compound represented by general formula (31)

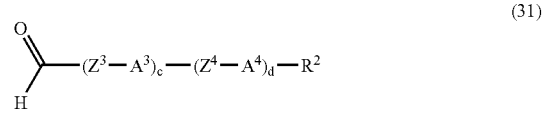

(31)

(wherein $R^2$, $A^3$, $A^4$, $Z^3$, $Z^4$, c, and d each independently represents the same meaning as that of general formula (1)) to produce a compound represented by general formula (15).

According to the present invention, a liquid crystal composition containing the compound represented by general formula (1) is provided. In such a case, the composition may contain only one kind of the compound represented by general formula (1), and also preferably contains at least two kinds of the compounds of general formula (1). The content ratio of the compound represented by general formula (1) is preferably 2 to 40% by mass, and more preferably 2 to 30% by mass, of the liquid crystal composition.

It is preferable that the liquid crystal composition according to the present invention contains in addition to the compound represented by general formula (I) a compound represented by general formula (2)

 (2)

(wherein $R^3$ and $R^4$ each independently represents hydrogen, an alkyl group having 1 to 12 carbon atoms, or an alkenyl group having 2 to 12 carbon atoms, in which one $CH_2$ group or at least two $CH_2$ groups not adjacent to each other may be substituted by oxygen or sulfur, or in which at least one hydrogen may be substituted by fluorine or chlorine, $B^1$ and $B^2$ each independently represents a trans-1,4-cyclohexylene group (in which one $CH_2$ group or two $CH_2$ groups not adjacent to each other may be substituted by oxygen or sulfur), 1,4-phenylene group (in which at least one CH group may be substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group or 1,2,3,4-tetrahydronaphthalene-2,6-diyl group, in which hydrogen may be substituted by —CN or halogen, $Y^1$ and $Y^2$ each independently represents —$CH_2CH_2$—, —CH=CH—, —CH($CH_3$)$CH_2$—, —$CH_2$CH($CH_3$)—, —CH($CH_3$)CH($CH_3$)—, —$CF_2CF_2$—, —CF=CF—, —$CH_2$O—, —O$CH_2$—, —OCH($CH_3$)—, —CH($CH_3$)O—, —($CH_2$)$_4$—, —($CH_2$)$_3$O—, —O($CH_2$)$_3$—, —C≡C—, —$CF_2$O—, —O$CF_2$—, —COO—, —OCO—, —COS—, —SCO—, or a single bond, when $Y^2$ and $B^2$ respectively plurally exist, they may be identical to each other, or different from each other, and p represents 0, 1, or 2).

It is preferable that in general formula (2) $R^3$ and $R^4$ each independently represents an alkyl group having 1 to 12 carbon atoms, an alkenyl group having 2 to 12 carbon atoms, an alkoxy group having 1 to 12 carbon atoms, an alkyl group having 1 to 7 carbon atoms substituted by an alkoxy group having 1 to 5 carbon atoms, or an alkenyl group having 2 to 7 carbon atoms substituted by an alkoxy group having 1 to 5 carbon atoms, and more preferably represents an alkyl group having 1 to 12 carbon atoms, or an alkenyl group having 2 to 12 carbon atoms, and specifically represents —CH$_3$, —CH$_2$CH$_3$, —(CH$_2$)$_2$CH$_3$, —(CH$_2$)$_3$CH$_3$, —(CH$_2$)$_4$ CH$_3$, —(CH$_2$)$_5$CH$_3$, —(CH$_2$)$_6$CH$_3$, —(CH$_2$)$_7$ CH$_3$, —CH=CH$_2$, —CH=CHCH$_3$ (E from), —(CH$_2$)$_2$ CH=CH$_2$, —(CH$_2$)$_2$CH=CHCH$_3$ (E from), —(CH$_2$)$_4$ CH=CH$_2$, —(CH$_2$)$_4$CH=CHCH$_3$ (E from), —OCH$_3$, —OCH$_2$CH$_3$, —O(CH$_2$)$_2$CH$_3$, —O(CH$_2$)$_3$CH$_3$ or —O(CH$_2$)$_4$CH$_3$. When a ring to be substituted is an aromatic ring, it is particularly preferable to represent —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —(CH$_2$)$_2$ CH=CH$_2$, —(CH$_2$)$_2$CH=CHCH$_3$ (E from), —(CH$_2$)$_4$ CH=CH$_2$, —(CH$_2$)$_4$CH=CHCH$_3$ (E from), —OCH$_3$, —OCH$_2$CH$_3$, —O(CH$_2$)$_2$CH$_3$, —O(CH$_2$)$_3$CH$_3$ or —O(CH$_2$)$_4$CH$_3$.

It is preferable that B$^1$ and B$^2$ each independently represents a trans-1,4-cyclohexylene group (including one in which one CH$_2$ group or two CH$_2$ groups not adjacent to each other is(are) substituted by oxygen), 1,4-phenylene group (including one in which one or two CH group(s) is(are) substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group or 1,2,3,4-tetrahydronaphthalene-2,6-diyl group, or a substituent in which hydrogen thereof is substituted by fluorine, and more preferably represents a trans-1,4-cyclohexylene group, 1,4-cyclohexenylene group, 1,4-phenylene group, 2-fluoro-1,4-phenylene group, 3-fluoro-1,4-phenylene group, 2,3-difluoro-1,4-phenylene group, or 1,4-bicyclo[2.2.2]octylene group, and even more preferably represents a trans-1,4-cyclohexylene group, 1,4-phenylene group, 2-fluoro-1,4-phenylene group, 3-fluoro-1,4-phenylene group, or 2,3-difluoro-1,4-phenylene group, and particularly represents a trans-1,4-cyclohexylene group or 1,4-phenylene group.

It is preferable that Y$^1$ and Y$^2$ each independently represents —CH$_2$CH$_2$—, —CH=CH— (E form), —CH(CH$_3$) CH$_2$—, —CH$_2$CH(CH$_3$)—, —CF$_2$CF$_2$—, —CF=CF— (E form), —CH$_2$O—, —OCH$_2$—, —OCH(CH$_3$)—, —CH (CH$_3$)O—, —(CH$_2$)$_4$—, —C≡C—, —CF$_2$O—, —OCF$_2$—, —COO—, —OCO—, or a single bond, and more preferably represents —CH$_2$CH$_2$—, —CH=CH— (E form), —CH$_2$O—, —OCH$_2$—, —C≡C—, —CF$_2$O—, —OCF$_2$—, —COO—, —OCO—, or a single bond, and even more preferably represents —CH$_2$CH$_2$—, —CH=CH— (E form), —C≡C—, —COO—, —OCO—, or a single bond, and particularly represents —CH$_2$CH$_2$— or a single bond.

It is preferable that p represents 1 or 2.

It is preferable that the compound represented by general formula (2) specifically has one of the following structures represented by general formulae (2-1) to (2-22):

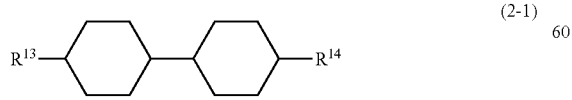
(2-1)

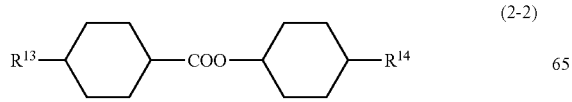
(2-2)

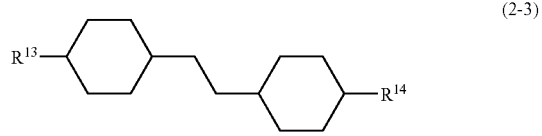
(2-3)

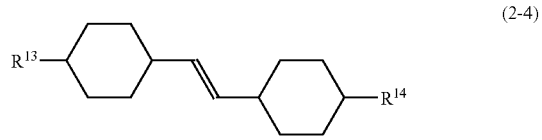
(2-4)

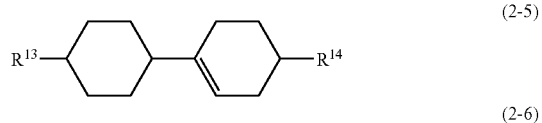
(2-5)

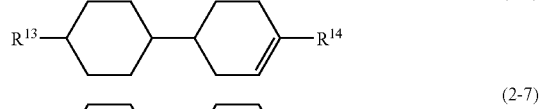
(2-6)

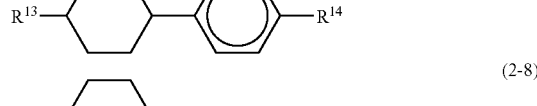
(2-7)

(2-8)

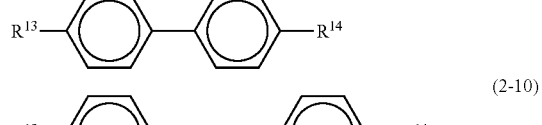
(2-9)

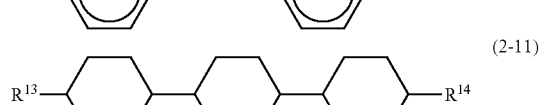
(2-10)

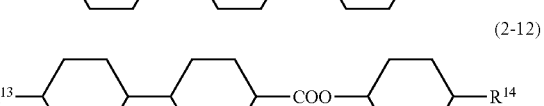
(2-11)

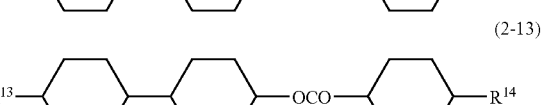
(2-12)

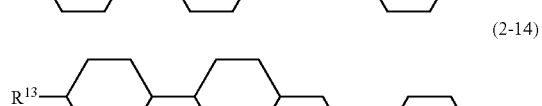
(2-13)

(2-14)

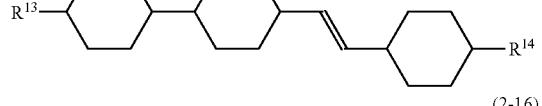
(2-15)

(2-16)

-continued

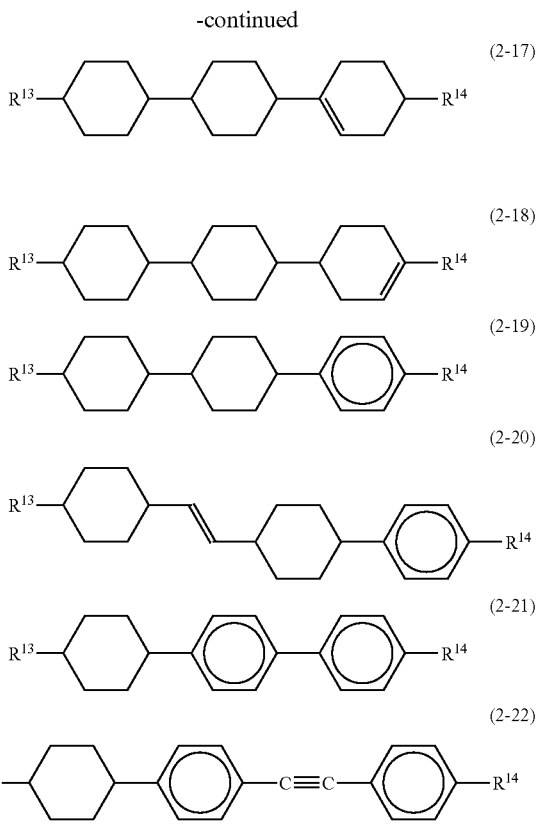

(2-17)
(2-18)
(2-19)
(2-20)
(2-21)
(2-22)

(wherein $R^{13}$ and $R^{14}$ each independently represents —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —CH=CH$_2$, —CH=CHCH$_3$ (E form), —(CH$_2$)$_2$CH=CH$_2$, —(CH$_2$)$_2$CH=CHCH$_3$ (E form), —OCH$_3$, —OCH$_2$CH$_3$, —O(CH$_2$)$_2$CH$_3$, —O(CH$_2$)$_3$CH$_3$ or —O(CH$_2$)$_4$CH$_3$).

It is preferable that the liquid crystal composition according to the present invention includes in addition to the compound represented by general formula (1) at least one compound selected from the group consisting of compounds represented by general formula (3a), general formula (3b), and general formula (3c):

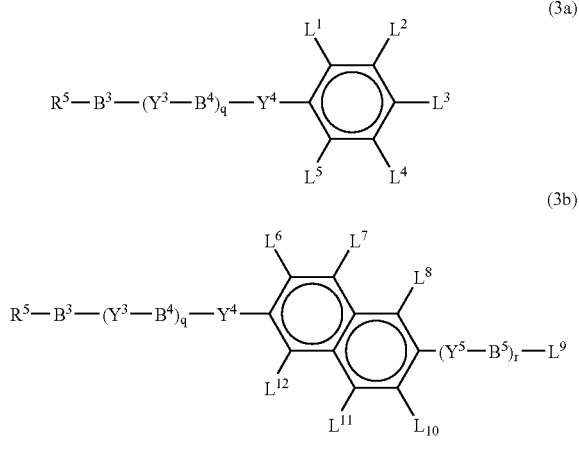

(3a)
(3b)
(3c)

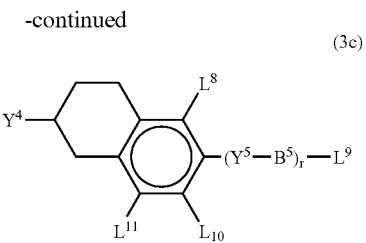

(wherein $R^5$ represents hydrogen, an alkyl group having 1 to 12 carbon atoms, or an alkenyl group having 2 to 12 carbon atoms, in which one CH$_2$ group or at least two CH$_2$ groups not adjacent to each other may be substituted by oxygen or sulfur, or in which at least one hydrogen may be substituted by fluorine or chlorine, $B^3$, $B^4$ and $B^5$ each independently represents a trans-1,4-cyclohexylene group (in which one CH$_2$ group or two CH$_2$ groups not adjacent to each other may be substituted by oxygen or sulfur), 1,4-phenylene group (in which at least one CH group may be substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group, or 1,2,3,4-tetrahydronaphthalene-2,6-diyl group, in which hydrogen may be substituted by —CN or halogen, $Y^3$, $Y^4$, and $Y^5$ each independently represents —CH$_2$CH$_2$—, —CH=CH—, —CH(CH$_3$)CH$_2$—, —CH$_2$CH(CH$_3$)—, —CH(CH$_3$)CH(CH$_3$)—, —CF$_2$CF$_2$—, —CF=CF—, —CH$_2$O—, —OCH$_2$—, —OCH(CH$_3$)—, —CH(CH$_3$)O—, —(CH$_2$)$_4$—, —(CH$_2$)$_3$O—, —O(CH$_2$)$_3$—, —C≡C—, —CF$_2$O—, —OCF$_2$—, —COO—, —OCO—, —COS—, —SCO—, or a single bond, $L^1$, $L^2$, $L^4$, $L^5$, $L^6$, $L^7$, $L^8$, $L^{10}$, $L^{11}$, and $L^{12}$ each independently represents hydrogen or fluorine, q and r each independently represents 0, 1, or 2, provided that the sum of q and r is no more than 2, $L^3$ and $L^9$ each independently represents hydrogen, fluorine, chlorine, —CN, —CF$_3$, —OCH$_2$F, —OCHF$_2$, —OCF$_3$, —CH$_2$ CF$_3$, or the same meaning as that of $R^5$).

It is preferable that, in general formula (3a), general formula (3b), and general formula (3c), $R^5$ represents an alkyl group having 1 to 12 carbon atoms, an alkenyl group having 2 to 12 carbon atoms, an alkoxy group having 1 to 12 carbon atoms, an alkyl group having 1 to 7 carbon atoms substituted by an alkoxy group having 1 to 5 carbon atoms, or an alkenyl group having 2 to 7 carbon atoms substituted by an alkoxy group having 1 to 5 carbon atoms, and more preferably represents an alkyl group having 1 to 12 carbon atoms, or an alkenyl group having 2 to 12 carbon atoms, and specifically represents —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —CH=CH$_2$, —CH=CHCH$_3$ (E form), —(CH$_2$)$_2$CH=CH$_2$, —(CH$_2$)$_2$CH=CHCH$_3$ (E form), —(CH$_2$)$_4$CH=CH$_2$, —(CH$_2$)$_4$CH=CHCH$_3$ (E form), —OCH$_3$, —OCH$_2$CH$_3$, —O(CH$_2$)$_2$CH$_3$, —O(CH$_2$)$_3$CH$_3$, or —O(CH$_2$)$_4$CH$_3$. When a ring to be substituted is an aromatic ring, it is particularly preferable to represent —CH$_3$, —CH$_2$CH$_3$, —(CH$_2$)$_2$CH$_3$, —(CH$_2$)$_3$CH$_3$, —(CH$_2$)$_4$ CH$_3$, —(CH$_2$)$_5$CH$_3$, —(CH$_2$)$_6$CH$_3$, —(CH$_2$)$_7$CH$_3$, —(CH$_2$)$_2$CH=CH$_2$, —(CH$_2$)$_2$CH=CHCH$_3$ (E form), —(CH$_2$)$_4$CH=CH$_2$, —(CH$_2$)$_4$CH=CHCH$_3$ (E form), —OCH$_3$, —OCH$_2$CH$_3$, —O(CH$_2$)$_2$CH$_3$, —O(CH$_2$)$_3$CH$_3$, or —O(CH$_2$)$_4$CH$_3$.

It is preferable that B$^3$, B$^4$, and B$^5$ each independently represents a trans-1,4-cyclohexylene group (including one in which one CH$_2$ group or two CH$_2$ groups not adjacent to each other is(are) substituted by oxygen), 1,4-phenylene group (including one in which one or two CH group(s) is(are) substituted by nitrogen), 1,4-cyclohexenylene group, 1,4-bicyclo[2.2.2]octylene group, piperidine-1,4-diyl group, naphthalene-2,6-diyl group, decahydronaphthalene-2,6-diyl group, or 1,2,3,4-tetrahydronaphthalene-2,6-diyl group, or a substituent in which hydrogen thereof is substituted by fluorine, and more preferably represents a trans-1,4-cyclohexylene group, 1,4-phenylene group, 2-fluoro-1,4-phenylene group, 3-fluoro-1,4-phenylene group, 2,3-difluoro-1,4-phenylene group, or 1,4-bicyclo[2.2.2]octylene group, and even more preferably represents a trans-1,4-cyclohexylene group, 1,4-phenylene group, 2-fluoro-1,4-phenylene group, 3-fluoro-1,4-phenylene group, or 2,3-difluoro-1,4-phenylene group, and particularly represents a trans-1,4-cyclohexylene group or 1,4-phenylene group.

It is preferable tha Y$^3$, Y$^4$, and Y$^5$ each independently represents —CH$_2$CH$_2$—, —CH=CH— (E form), —CH(CH$_3$)CH$_2$—, —CH$_2$CH(CH$_3$)—, —CF$_2$CF$_2$—, —CF=CF— (E form), —CH$_2$O—, —OCH$_2$—, —OCH(CH$_3$)—, —CH(CH$_3$)O—, —(CH$_2$)$_4$—, —C≡C—, —CF$_2$O—, —OCF$_2$—, —COO—, —OCO—, or a single bond, and more preferably represents —CH$_2$CH$_2$—, —CH=CH— (E form), —CH(CH$_3$)CH$_2$—, —CH$_2$CH(CH$_3$)—, —CF$_2$CF$_2$—, —CF=CF— (E form), —CH$_2$O—, —OCH$_2$—, —OCH(CH$_3$)—, —CH(CH$_3$)O—, —C≡C—, —CF$_2$O—, —OCF$_2$—, or a single bond, and even more preferably represents —CH$_2$CH$_2$—, —CH$_2$O—, —OCH$_2$—, —CF$_2$O—, —OCF$_2$—, —CH=CH— (E form), or a single bond, and particularly preferably represents —CH$_2$CH$_2$—, —CH$_2$O—, —OCH$_2$—, or a single bond.

Although L$^1$, L$^2$, L$^4$, L$^5$, L$^6$, L$^7$, L$^8$, L$^{10}$, L$^{11}$, and L$^{12}$ each independently represents hydrogen or fluorine, it is preferable that at least one represents fluorine, and it is also preferable that two or three represent fluorine. It is preferable that in general formula (3a) L$^1$ and L$^2$ represent hydrogen, and L$^4$ and L$^5$ represent fluorine. When at least one selected from the substituent group consisting of L$^6$, L$^7$, and L$^8$ represents fluorine in general formula (3b), it is preferable that all of L$^{10}$, L$^{11}$, and L$^{12}$ represent hydrogen, and when at least one selected from the substituent group consisting of, L$^{10}$, L$^{11}$, and L$^{12}$ represents fluorine, it is preferable that all of L$^6$, L$^7$, and L$^8$ represent hydrogen. When at least one selected from the substituent group consisting of L$^{10}$ and L$^{11}$ represents fluorine in general formula (3c), it is preferable that L$^8$ represents hydrogen, and when L$^8$ represents fluorine, it is preferable that both L$^{10}$ and L$^{11}$ represent hydrogen.

It is preferable that the compounds repesented by general formula (3a) specifically have one of the following structures represented by general formulae (3a-1) to (3a-10):

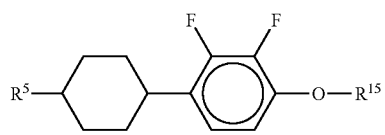
(3a-1)

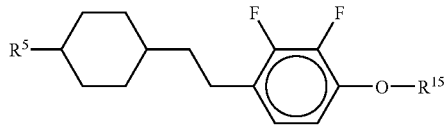
(3a-2)

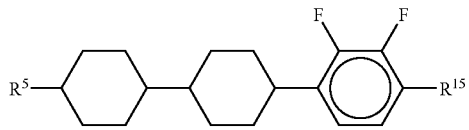
(3a-3)

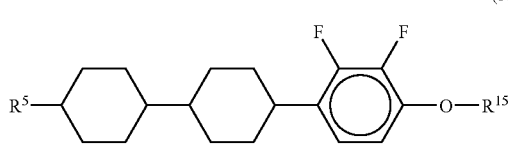
(3a-4)

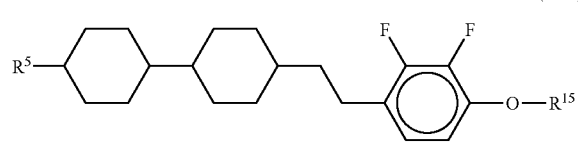
(3a-5)

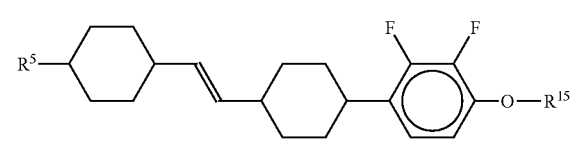
(3a-6)

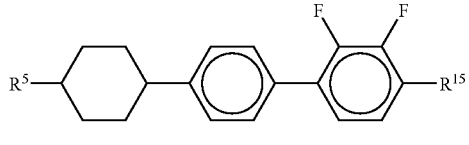
(3a-7)

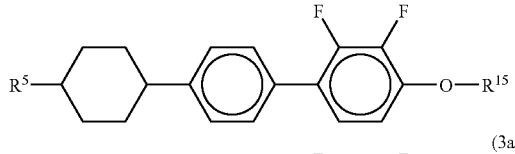
(3a-8)

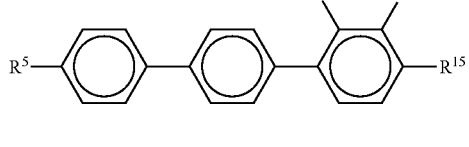
(3a-9)

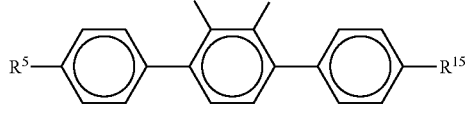
(3a-10)

(wherein R$^5$ and R$^{15}$ each independently represents —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —CH=CH$_2$, —CH=CHCH$_3$ (E form), —(CH$_2$)$_2$CH=CH$_2$, or —(CH$_2$)$_2$CH=CHCH$_3$ (E form)).

It is preferable that the compound represented by general formula (3b) specifically has one of the following structures represented by general formulae (3b-1) to (3b-8):

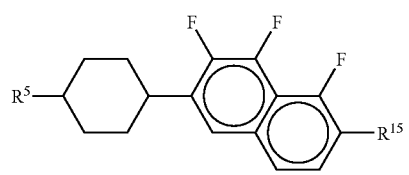
(3b-1)

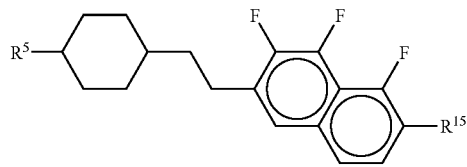
(3b-2)

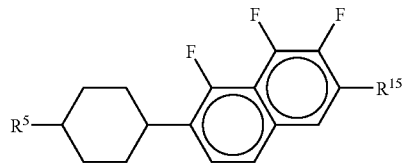
(3b-3)

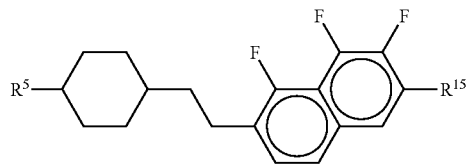
(3b-4)

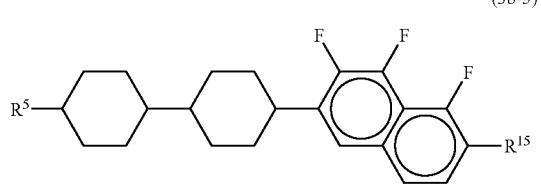
(3b-5)

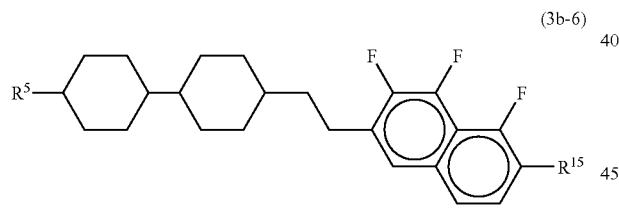
(3b-6)

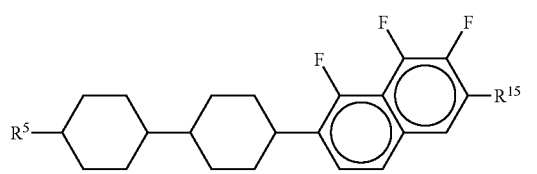
(3b-7)

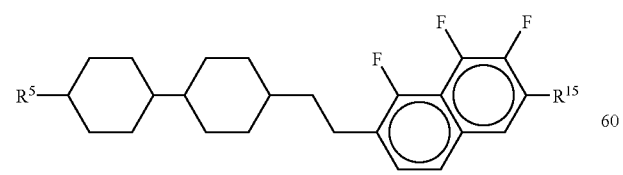
(3b-8)

(wherein $R^5$ and $R^{15}$ each independently represents —$CH_3$, —$CH_2CH_3$, —$(CH_2)_2CH_3$, —$(CH_2)_3CH_3$, —$(CH_2)_4CH_3$, —$(CH_2)_5CH_3$, —$(CH_2)_6CH_3$, —$CH=CH_2$, —$CH=CHCH_3$ (E form), —$(CH_2)_2CH=CH_2$, —$(CH_2)_2CH=CHCH_3$ (E form), —$OCH_3$, —$OCH_2CH_3$, —$O(CH_2)_2CH_3$, —$O(CH_2)_3CH_3$, or —$O(CH_2)_4CH_3$).

It is preferable that the compound represented by general formula (3c) specifically has one of the following structures represented by general formulae (3c-1) to (3c-3).

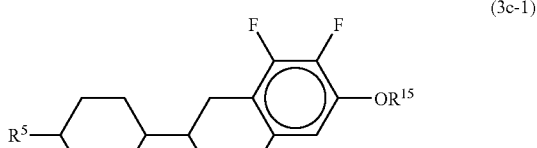
(3c-1)

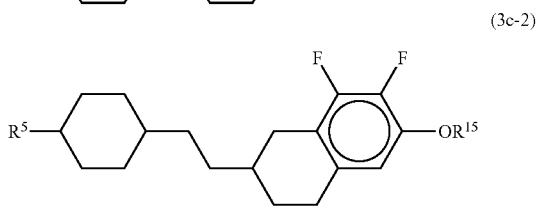
(3c-2)

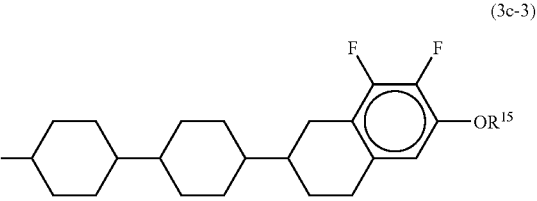
(3c-3)

It is more preferable that the liquid crystal composition according to the present invention contains the compound represented by general formula (1), the compound represented by general formula (2), and the compound selected from the compounds represented by general formulae (3a) to (3c).

It is preferable that the dielectric anisotropy of the liquid crystal composition be −0.2, and more preferably no more than −0.4.

EXAMPLES

Hereinafter, the present invention will be explained in more detail with reference to Examples. However, it is apparent that the present invention is not limited to these Examples. Also, "%" used in the Examples and Comparative Examples indicates "% by mass".

Figure 2:
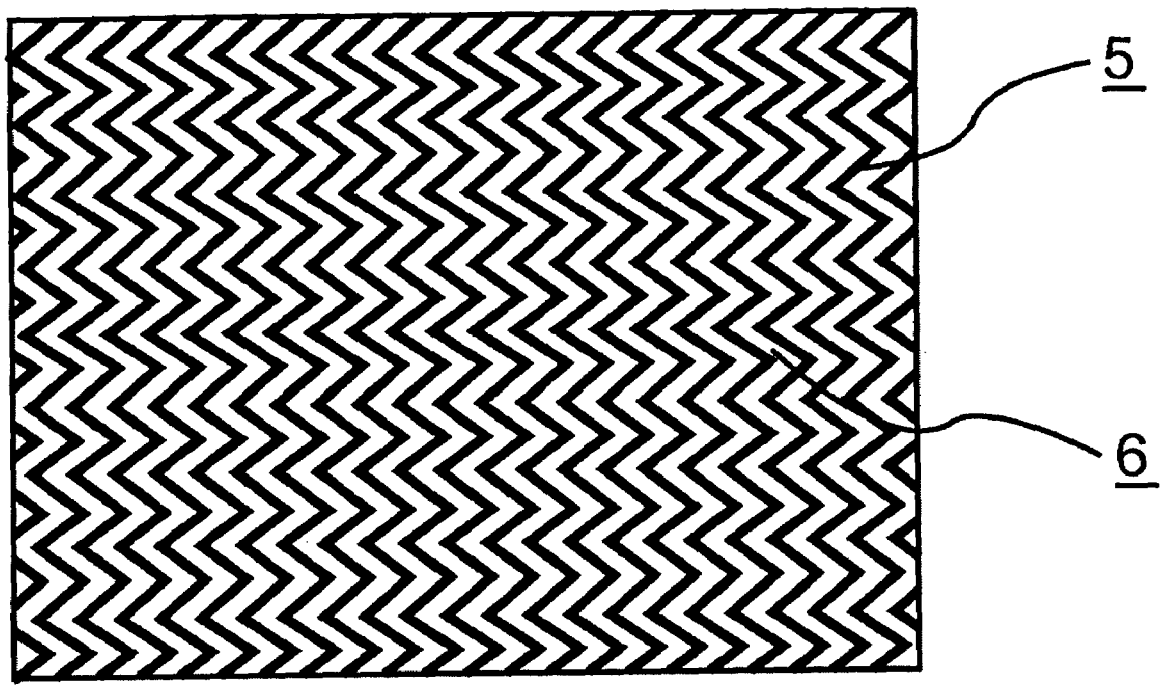
FIG. 2 is a view showing a transparent electrode including a slit having a zigzag bending pattern.
Figure 3:
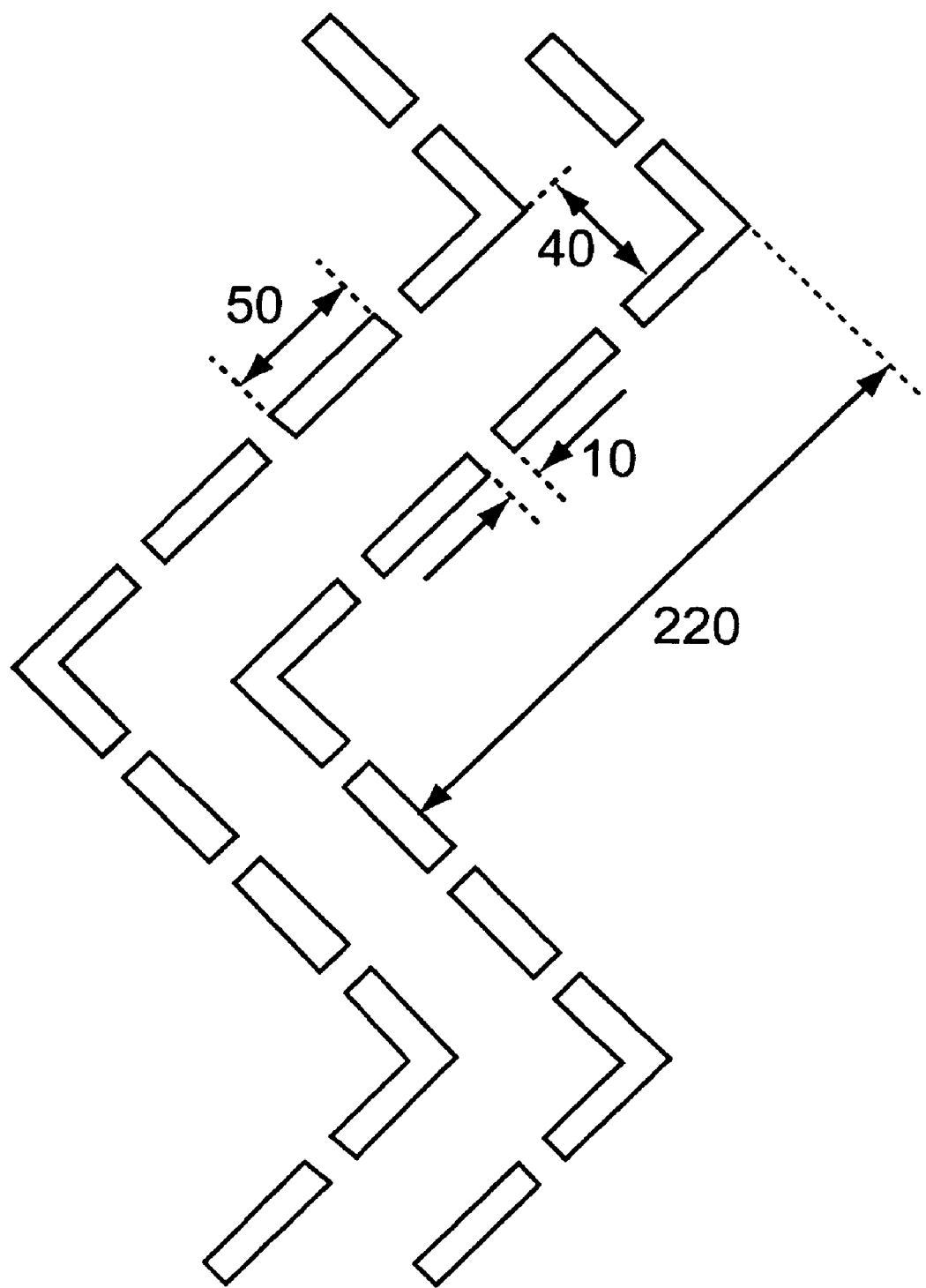
FIG. 3 is a view showing a slit having a zigzag bending pattern (unit: μm).

A liquid crystal display device having VA mode display characteristics was made according to the following method (see FIG. 1). On one of a pair of substrates (1) opposing each other, a transparent flat electrode (2) was provided, on which a vertical alignment film (3) (manufactured by JSR Corporation under the trade name of JALS-204) was formed. On the other of the pair of substrates (1), a transparent electrode (5) (see FIG. 3) on which zigzag slits (6) each with a width of 10 µm (slits having a zigzag bending pattern) were formed at intervals of 50 µm as shown in FIG. 2 was provided, on which a vertical alignment film (3) (manufactured by JSR Corporation under the trade name of JALS-204) was formed. Then, one of the glass substrates was laid on the other substrate to produce a display cell for VA-LCD (which has a cell thickness of 3.5 µm). Into this cell, a liquid crystal composition was poured to produce a liquid crystal phase (4), and then the liquid crystal display device was formed.

Characteristics measured in Examples are as follows.

| | |
|---|---|
| $T_{N-I}$: | Nematic Phase - Isotropic Liquid Phase Transition Temperature (° C.) |
| $\Delta\epsilon$: | Dielectric Anisotropy (Value measured at 25° C. and 1 kHz) |
| $\Delta n$: | Double Refraction (Value measured at 20° C. and 589 nm) |

Cells having a thickness of 6 μm with vertical alignment (homeotropic alignment) (in which JALS-204 manufactured by JSR Corporation was used as an alignment film) were used.

The following abbreviations are used for indicating compounds.

| | |
|---|---|
| THF: | Tetrahydrofuran |
| DMF: | N,N-Dimethylformamide |
| p-TsOH: | p-Toluenesulfonate |
| Et: | Ethyl group |
| Bu: | Butyl group |
| CN: | Cyano group |
| Ms: | Methanesulfonyl group |

Example 1

Synthesis of 7,8-difluoro-6-[trans-4-(trans-4-propylcyclohexyl)cyclohexyl]-2-propylchroman (Ia)

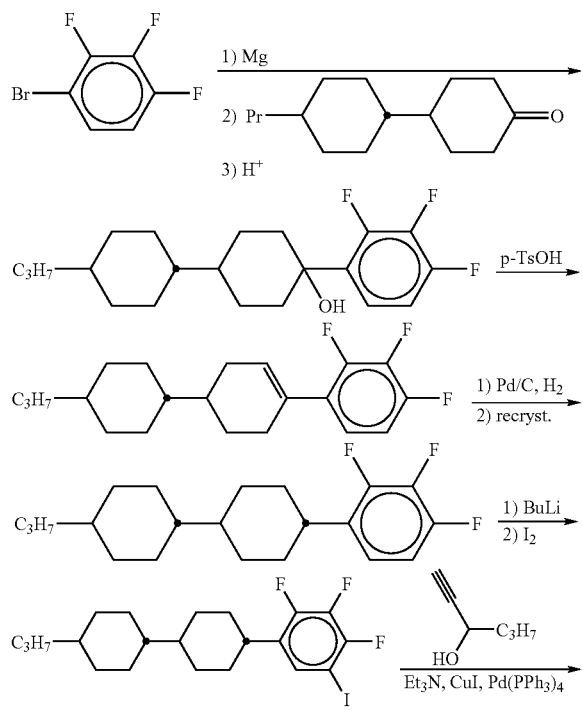

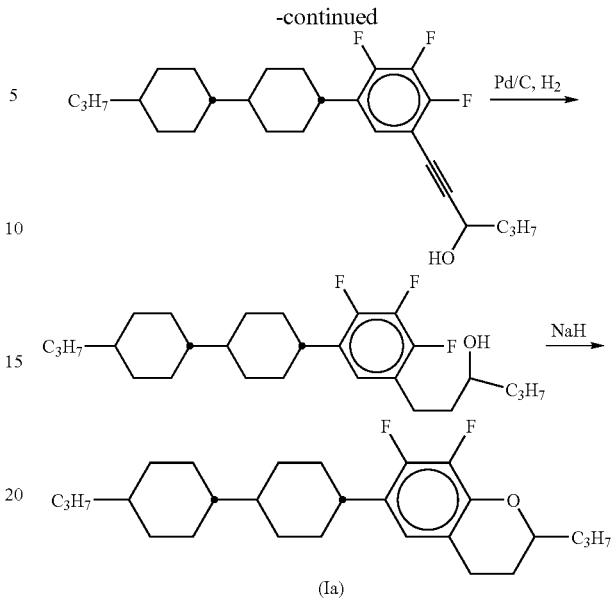

(Ia)

(1-1) Synthesis of 2,3,4-trifluoro-1-[1-hydroxy-4-(trans-4-propylcyclohexyl) cyclohexyl]benzene Into 7.6 g of magnesium and 20 mL of THF which were stirred while water-cooling in a nitrogen atmosphere, a THF solution (200 mL) containing 60 g of 2,3,4-trifluorobromobenzene was added dropwise for 2 hours, and stirred for 3 hours. Into this, a THF solution (200 mL) containing 70 g of 4-(trans-4-propylcyclohexyl)cyclohexanone was added dropwise for 2 hours, and stirred for 2 hours. After the reaction solution was poured into 10% hydrochloric acid and stirred for a while, an organic layer was separated, and an aqueous layer was extracted with toluene. After the extract and the organic layer were mixed together, washed using water and a saturated saline solution in that order, and dried using anhydrous sodium sulfate, the solvent was evaporated under a reduced pressure to obtain 110 g of 2,3,4-trifluoro-1-[1-hydroxy-4-(trans-4-propylcyclohexyl)cyclohexyl]benzene (unsatisfactorily dried).

MS m/z: 354 (M$^+$), 55 (100)

(1-2) Synthesis of 2,3,4-trifluoro-1-[4-(trans-4-propylcyclohexyl)-1-cyclohexenyl]benzene To 110 g of 2,3,4-trifluoro-1-[1-hydroxy-4-(trans-4-propylcyclohexyl)cyclohexyl]benzene (unsatisfactorily dried) which was dissolved into 400 mL of toluene, 10 g of p-toluenesulfonic anhydride was added, and heated to reflux for 2 hours. After water was added, and stirred for a while, an organic layer was separated, and an aqueous layer was extracted with toluene. After the extract and the organic layer were mixed together, washed using water and a saturated saline solution in that order, and dried using anhydrous magnesium sulfate, the solvent was evaporated under a reduced pressure. The residue was purified by column chromatography (silica gel, hexane) to obtain 93 g of 2,3,4-trifluoro-1-[4-(trans-4-propylcyclohexyl)-1-cyclohexenyl]benzene.

MS m/z: 336 (M$^+$), 69 (100)

(1-3) Synthesis of 2,3,4-trifluoro-1-[trans-4-(trans-4-propylcyclohexyl)cyclohexyl]benzene To 93 g of 2,3,4-trifluoro-1-[4-(trans-4-propylcyclohexyl)-1-cyclohexenyl]benzene which was dissolved into 300 mL of ethyl acetate, 9 g of 5% palladium carbon (50% in water) was added, and stirred for 5 hours at a hydrogen pressure of 0.5 MPa. After palladium carbon was removed by filtration, the solvent was evaporated under a reduced pressure to obtain 90 g of a mixture containing a light yellow oily material and a light yellow solid. Of the mixture, 80 g was purified by recrystallization (ethanol/methanol/hexane) to obtain 17 g of 2,3,4-trifluoro-1-[trans-4-(trans-4-propylcyclohexyl)cyclohexyl]benzene.

MS m/z: 338 ($M^+$), 69 (100)

(1-4) Synthesis of 5-iodo-2,3,4-trifluoro-1-[trans-4-(trans-4-propylcyclohexyl)cyclohexyl]benzene In a nitrogen atmosphere, 17 g of 2,3,4-trifluoro-1-[trans-4-(trans-4-propylcyclohexyl)cyclohexyl]benzene was dissolved into 300 mL of THF, and cooled to −60° C. Into this, 39 mL of butyllithium (1.56 M of hexane solution) was added dropwise for 30 minutes, and stirred for 2 hours. Into this, a THF solution (50 mL) containing 14 g of iodine was added dropwise for 1 hour, and warmed to room temperature. After the reaction solution was poured into a sodium thiosulfate aqueous solution, and stirred for a while, an organic layer was separated, and an aqueous layer was extracted with toluene. After the extract and the organic layer were mixed together, washed using water and a saturated saline solution in that order, and dried using anhydrous magnesium sulfate, the solvent was evaporated under a reduced pressure to obtain 25 g of 5-iodo-2,3,4-trifluoro-1-[trans-4-(trans-4-propylcyclohexyl)cyclohexyl]benzene.

MS m/z: 464 ($M^+$), 69 (100)

(1-5) Synthesis of 5-(3-hydroxy-1-hexynyl)-2,3,4-trifluoro-1-[trans-4-(trans-4-propylcyclohexyl)cyclohexyl]benzene In a nitrogen atmosphere, 25 g of 5-iodo-2,3,4-trifluoro-1-[trans-4-(trans-4-propylcyclohexyl)cyclohexyl]benzene was dissolved into 300 mL of DMF, to which 21 mL of triethylamine, 0.19 g of copper iodide (I), and 0.58 g of tetrakistriphenylphosphine palladium (0) were added, followed by heating to 55° C. Into this, the DMF (30 mL) solution containing 5.9 g of 1-hexine-3-ol was added dropwise for 20 minutes, and stirred for 3 hours. After the reaction mixture was poured into a sodium thiosulfate aqueous solution, and stirred for a while, an organic layer was separated and an aqueous layer was extracted with toluene. After the extract and the organic layer were mixed together, washed using water, 10% hydrochloric acid twice, water, a saturated sodium hydrogen carbonate aqueous solution, and a saturated saline solution in that order, and dried using anhydrous magnesium sulfate, the solvent was evaporated under a reduced pressure. The residue was purified by sequentially carrying out column chromatography (silica gel, toluene) twice, activated carbon treatment (acetone), and column chromatography (silica gel, hexane/acetone), to obtain 20 g of 5-(3-hydroxy-1-hexynyl)-2,3,4-trifluoro-1-[trans-4-(trans-4-propylcyclohexyl)cyclohexyl]benzene.

MS m/z: 434 ($M^+$), 69 (100)

(1-6) Synthesis of 5-(3-hydroxy-1-hexyl)-2,3,4-trifluoro-1-[trans-4-(trans-4-propylcyohexyl)cyclohexyl]benzene To 20 g of 5-(3-hydroxy-1-hexynyl)-2,3,4-trifluoro-1-[trans-4-(trans-4-propylcyclohexyl) cyclohexyl]benzene which was dissolved into 80 mL of ethanol, 2 g of 5% palladium carbon (50% in water) was added, stirred for 6 hours at a hydrogen pressure of 0.5 MPa, and was then left to stand overnight. After palladium carbon was removed by filtration, the solvent was evaporated under a reduced pressure to obtain 10 g of 5-(3-hydroxy-1-hexyl)-2,3,4-trifluoro-1-[trans-4-(trans-4-propylcyclohexyl)cyclohexyl]benzene.

MS m/z: 438 ($M^+$), 420 (100)

(1-7) Synthesis of 7,8-difluoro-6-[trans-4-(trans-4-propylcyclohexyl)cyclohexyl]-2-propylchroman Under nitrogen replacement, 1.23 g of sodium hydride (60% in oil) was suspended in 18 ml of DMF. Into this, the THF (36 mL) solution containing 9 g of 5-(3-hydroxy-1-hexyl)-2,3,4-trifluoro-1-[trans-4-(trans-4-propylcyclohexyl)cyclohexyl]benzene was added dropwise for 30 minutes, and stirred for 3 hours at 40° C. and then for 3 hours at 50° C. After toluene was added and stirred for a while, an organic layer was separated and an aqueous layer was extracted with toluene. After the extract and the organic layer were mixed together, washed using water and a saturated saline solution in that order, and dried using anhydrous sodium sulfate, the solvent was evaporated under a reduced pressure. The residue was purified by carrying out column chromatography (silica gel, hexane), recrystallization (hexane), recrystallization (hexane/ethanol) to obtain 2.5 g of 7,8-difluoro-6-[trans-4-(trans-4-propylcyclohexyl)cyclohexyl]-2-propylchroman as colorless needlelike crystals.

MS m/z: 418 ($M^+$, 100)

$^1$H-NMR (400 MHz, $CDCl_3$)

δ(ppm): 0.87 (t, J=7.6 Hz, 3H), 0.97 (t, J=7.2 Hz, 3H), 1.1–1.2 (m, 6H), 1.25–1.65 (m, 10H), 1.65–1.9 (m, 12H), 1.95–2.05 (m, 1H), 2.6–2.85 (m, 3H), 3.9–4.05 (m, 1H), 6.58 (d, J=6.4 Hz, 1H)

Example 2

Synthesis of 6-[4-(trans-4-propylcyclohexyl)phenyl]-7,8-difluoro-2-propylchroman (Ib)

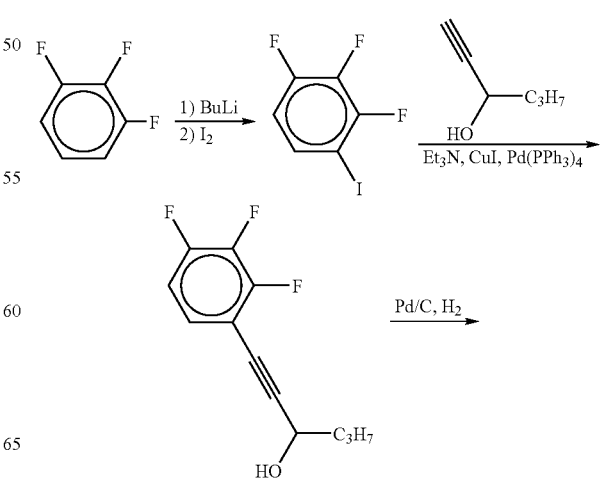

-continued

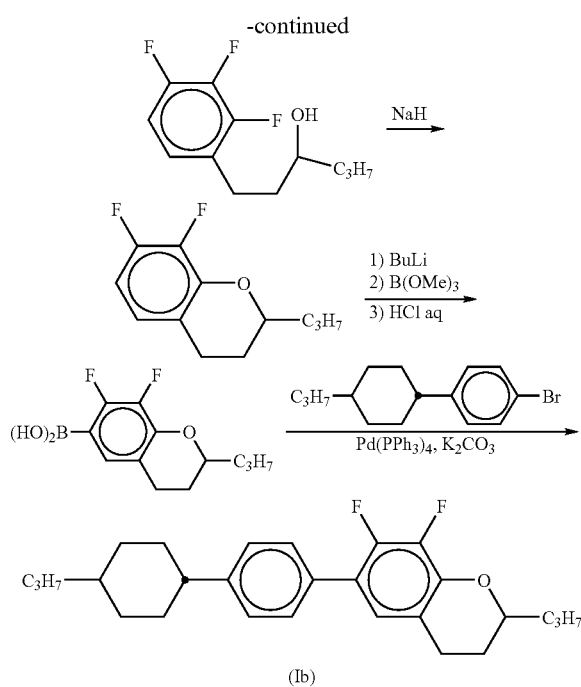

(2-1) Synthesis of 4-iodo-1,2,3-trifluorobenzene

In a nitrogen atmosphere, 1,2,3-trifluorobenzene was dissolved into THF, and cooled to −60° C. Then, butyllithium (1.56 M hexane solution) was added dropwise for 30 minutes, and stirred for 2 hours. Then, the THF solution containing iodine was added dropwise for 1 hour, and warmed to room temperature. After the reaction solution was poured into a sodium thiosulfate aqueous solution and stirred for a while, an organic layer was separated, and an aqueous layer was extracted with toluene. After the extract and the organic layer were mixed together, washed using water and a saturated saline solution in that order, and dried using anhydrous sodium sulfate, the solvent was evaporated under a reduced pressure to obtain 4-iodo-1,2,3-trifluorobenzene.

(2-2) Synthesis of 1-(3-hydroxy-1-hexynyl)-2,3,4-trifluorobenzene

In a nitrogen atmosphere, 4-iodo-1,2,3-trifluorobenzene was dissolved into DMF, into which triethylamine, copper iodide (I), and tetrakistriphenylphosphine palladium (0) were added and heated to 55° C. Then, the DMF solution containing 1-hexine-3-ol was added dropwise for 20 minutes, and stirred for 3 hours. After the reaction mixture was poured into a sodium thiosulfate aqueous solution, and stirred for a while, an organic layer was separated, and an aqueous layer was extracted with toluene. After the extract and the organic layer were mixed together, washed using water, 10% hydrochloric acid twice, water, a saturated sodium hydrogen carbonate aqueous solution, and a saturated saline solution in that order, and dried using anhydrous magnesium sulfate, the solvent was evaporated under a reduced pressure. The residue was purified by column chromatography (silica gel, toluene/hexane) to obtain 1-(3-hydroxy-1-hexynyl)-2,3,4-trifluorobenzene.

(2-3) Synthesis of 1-(3-hydroxyhexyl)-2,3,4-trifluorobenzene

After 1-(3-hydroxy-1-hexynyl)-2,3,4-trifluorobenzene was dissolved in ethanol, 5% palladium carbon (50% in water) was added thereto, and stirred for 6 hours at a hydrogen pressure of 0.5 MPa, and the mixture was left to stand overnight. After palladium carbon was removed by filtration, the solvent was evaporated under a reduced pressure to obtain 1-(3-hydroxy-1-hexyl)-2,3,4-trifluorobenzene.

(2-4) Synthesis of 7,8-difluoro-2-propylchroman

Sodium hydride (60% in oil) was suspended in DMF under nitrogen replacement. Then, the THF solution containing 1-(3-hydroxy-1-hexyl)-2,3,4-trifluorobenzene was added dropwise for 30 minutes, and stirred for 3 hours at 50° C. After toluene was added and stirred for a while, an organic layer was separated and an aqueous layer was extracted with toluene. After the extract and the organic layer were mixed together, washed using water and a saturated saline solution in that order, and dried using anhydrous sodium sulfate, the solvent was evaporated under a reduced pressure. The residue was purified by column chromatography (silica gel, hexane) to obtain 7,8-difluoro-2-propylchroman.

(2-5) Synthesis of 7,8-difluoro-2-propylchroman-6-borate

In a nitrogen atmosphere, 7,8-difluoro-2-propylchroman was dissolved in THF, and was then cooled to −60° C. Then, butyllithium (1.56 M hexane solution) was added dropwise for 30 minutes, and the mixture was then stirred for 2 hours. Then, the THF solution of trimethyl borate was added dropwise for 1 hour, and warmed to room temperature. After the reaction solution was poured into 10% hydrochloric acid, and stirred for 2 hours, an organic layer was separated, and an aqueous layer was extracted with toluene. After the extract and the organic layer were mixed together, washed using water and a saturated saline solution in that order, and dried using anhydrous magnesium sulfate, the solvent was evaporated under a reduced pressure to obtain 7,8-difluoro-2-propylchroman-6-borate.

(2-6) Synthesis of 6-[4-(trans-4-propylcyclohexyl)phenyl]-7,8-difluoro-2-propylchroman In a nitrogen atmosphere, 4-(trans-4-propylcyclohexyl)bromobenzene was dissolved in toluene, to which 7,8-difluoro-2-propylchroman-6-borate, potassium carbonate, water, and tetrakistriphenylphosphine palladium (0) were added. They were stirred for 5 hours at 90° C. under pressure. After the reaction mixture was poured into water and stirred for a while, an organic layer was separated and an aqueous layer was extracted with toluene. After the extract and the organic layer were mixed together, washed using water, 10% hydrochloric acid, and a saturated saline solution in that order, and dried using anhydrous magnesium sulfate, the solvent was evaporated under a reduced pressure. The residue was purified by carrying out column chromatography (silica gel, toluene) and recrystallization (toluene/hexane) to obtain 6-[4-(trans-4-propylcyclohexyl)phenyl]-7,8-difluoro-2-propylchroman.

$^1$H-NMR (400 MHz, CDCl$_3$) δ(ppm): 0.92 (t, J=7.2 Hz, 3H), 0.97 (t, J=7.2 Hz, 3H), 1.1–1.5 (m, 11H), 1.5–2.1 (m, 8H), 2.5–2.9 (m, 3H), 3.9–4.1 (m, 1H), 6.6–7.0 (m, 1H), 7.1–7.6 (m, 4H)

Example 3

Preparation of Liquid Crystal Composition (1)

A host liquid crystal composition (H) having the following components:

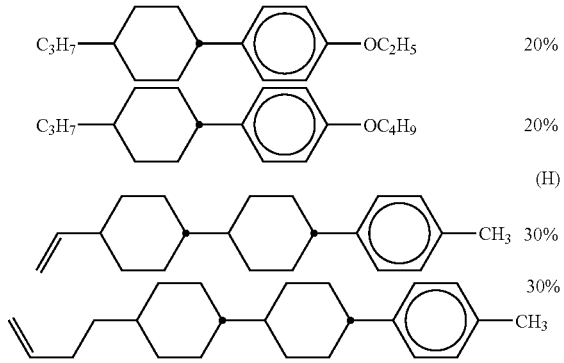

was prepared. The physical values of the composition (H) are as follows.

| | |
|---|---|
| Nematic Phase - Isotropic Liquid Phase Transition Temperature (T$_{N-I}$): | 103.2° C. |
| Dielectric Anisotropy (Δε): | 0.03 |
| Refractive Index Anisotropy (Δn): | 0.099 |

A liquid crystal composition (M-1) containing 90% of this host liquid crystal composition (H) and 10% of the compound represented by formula (Ia) prepared in Example 1 was prepared. The physical values of this composition are as follows.

| | |
|---|---|
| Nematic Phase - Isotropic Liquid Phase Transition Temperature (T$_{N-I}$): | 109.0° C. |
| Dielectric Anisotropy (Δε): | −0.52 |
| Refractive Index Anisotropy (Δn): | 0.098 |

In comparison with the host liquid crystal composition (H), the liquid crystal composition (M-1) containing the compound (Ia) according to the present invention had an increased nematic phase-isotropic liquid phase transition temperature (T$_{N-I}$) and a dielectric anisotropy (Δε) which decreased to a negative value. Thus, it was shown that the compound represented by formula (Ia) according to the present invention stably exhibited a nematic phase even at high temperature, and had a negative dielectric anisotropy of which the absolute value was extremely large.

Comparative Example 1

Preparation of Liquid Crystal Composition

A liquid crystal composition (N-1) containing 90% of the host liquid crystal composition (H) prepared in Example 3 and 10% of a compound represented by formula (R-1):

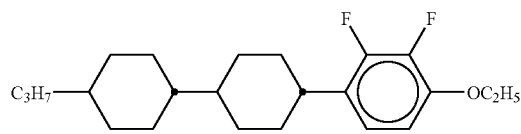

was prepared. The physical values of the compound are as follow.

| | |
|---|---|
| Nematic Phase - Isotropic Liquid Phase Transition Temperature (T$_{N-I}$): | 109.6° C. |
| Dielectric Anisotropy (Δε): | −0.42 |
| Refractive Index Anisotropy (Δn): | 0.100 |

It is apparent that the liquid crystal composition (N-1) containing the compound represented by formula (R-1) described in Patent Document 1 has a smaller absolute value of dielectric anisotropy and a slightly larger refractive index anisotropy in comparison with the composition (M-1) described in Example 1.

Comparative Example 2

Preparation of Liquid Crystal Composition

A liquid crystal composition (N-2) containing 90% of the host liquid crystal composition (H) prepared in Example 3 and 10% of a compound represented by formula (R-2)

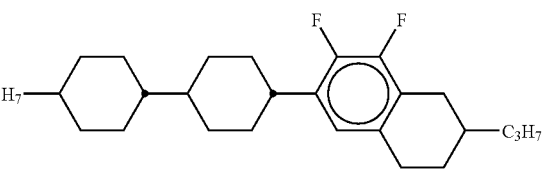

was prepared. The physical values of this composition are as follows.

| | |
|---|---|
| Nematic Phase - Isotropic Liquid Phase Transition Temperature (T$_{N-I}$): | 109.4° C. |
| Dielectric Anisotropy (Δε): | −0.22 |
| Refractive Index Anisotropy (Δn): | 0.099 |

It is apparent that the liquid crystal composition (N-2) containing the compound represented by formula (R-2) described in Patent Document 2 has a smaller absolute value of dielectric anisotropy in comparison with the composition (M-1) described in Example 3.

Comparative Example 3

Preparation of Liquid Crystal Composition

A liquid crystal composition (N-3) containing 90% of the host liquid crystal composition (H) prepared in Example 3 and 10% of a compound represented by formula (R-3)

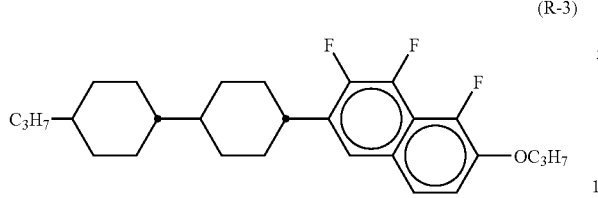

was prepared. The physical values of this composition are as follows.

| | |
|---|---|
| Nematic Phase - Isotropic Liquid Phase Transition Temperature ($T_{N-I}$): | 114.5° C. |
| Dielectric Anisotropy ($\Delta\epsilon$): | −0.60 |
| Refractive Index Anisotropy ($\Delta n$): | 0.105 |

Although the absolute value of dielectric anisotropy of the liquid crystal composition (N-3) containing the compound represented by formula (R-3) described in Patent Document 3 was larger than that of the composition (M-1) described in Example 3, the refractive index anisotropy of the liquid crystal composition (N-3) significantly increased.

Example 4

Synthesis of 2-butyl-7,8-difluoro-6-(trans-4-pentyl-cyclohexylmethoxy)chroman (Ie)

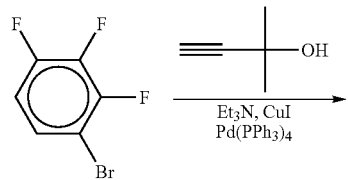

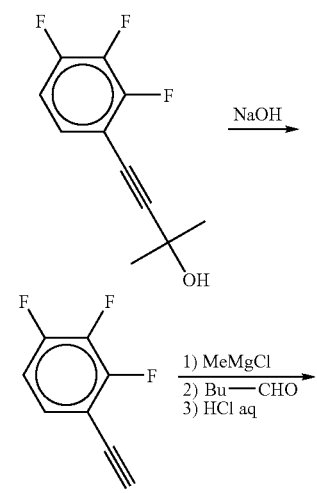

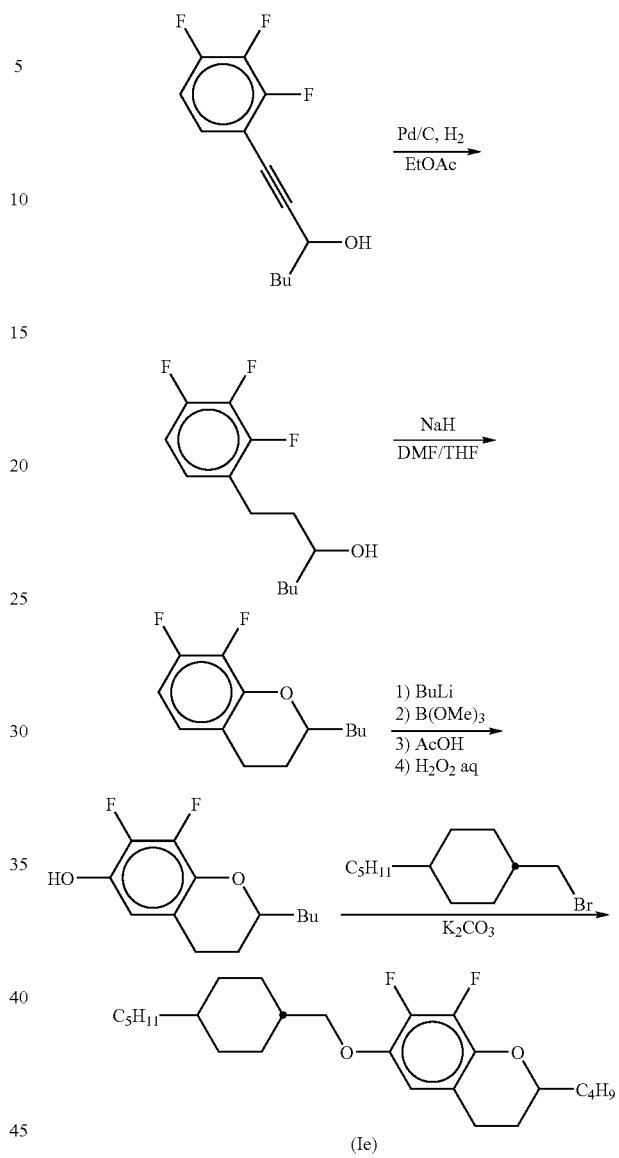

(4-1) Synthesis of 1-(3-methyl-3-hydroxy-1-butynyl)-2,3,4-trifluorobenzene

Under nitrogen replacement, 247 g of 2,3,4-trifluorobromobenzene was dissolved in 740 ml of DMF, into which 247 mL of triethylamine, 3.7 g of tetrakistriphenylphosphine palladium (0), and 4.4 g of copper iodide (I) were added, and heated to 70° C. To this, 108 g of 3-methyl-1-butyne-3-ol was added dropwise for 1 hour, and the mixutre was then stirred for 2 hours at room temperature, for 1 hour at 50° C., for 30 minutes at 60° C., and for 2 hours at 80° C. Then, 500 mL of water was added and cooled to room temperature, to which 200 mL of concentrated hydrochloric acid was added. After this was extracted twice using ethyl acetate, the extract and the organic layer were mixed together, washed using water and a saturated saline solution in that order, and dried using anhydrous magnesium sulfate. After the solvent was evaporated under a reduced pressure, the residue was purified by distillation under a reduced pressure (78 to 84° C./0.65 to 0.70 mmHg) to obtain 229 g of 1-(3-methyl-3-hydroxy-1-butynyl)-2,3,4-trifluorobenzene as a yellow solid.

(4-2) Synthesis of 1-ethynyl-2,3,4-trifluorobenzene 23 g of sodium hydroxide was added to 229 g of 1-(3-methyl-3-hydroxy-1-butynyl)-2,3,4-trifluorobenzene, and then stirred for 1 hour at 120° C., while acetone that is produced is distilled off using an atmospheric distillation device. This was purified by distillation under a reduced pressure (101 to 108° C./34 kPa (256 mmHg)) to obtain 110 g of 1-ethynyl-2,3,4-trifluorobenzene as an almost colorless oily material.

(4-3) Synthesis of 1-(3-hydroxy-1-heptynyl)-2,3,4-trifluorobenzene

Under nitrogen replacement, 110 g of 1-ethynyl-2,3,4-trifluorobenzene was dissolved in 440 mL of THF. To this, 846 mL of methylmagnesium bromide (1.0 M in Toluene/THF=4/1) was added dropwise for 1 hour while ice-cooling, and stirred for 30 minutes. To this, 72.8 g of pentanal was added dropwise for 1 hour, warmed to room temperature, and stirred for 1 hour. After the reaction solution was poured into 300 g of ice/300 mL of concentrated hydrochloric acid, and stirred for a while, an organic layer was separated and an aqueous layer was extracted with toluene. After the extract and the organic layer were mixed together, washed using water and a saturated saline solution in that order, and dried using anhydrous magnesium sulfate, the solvent was evaporated under a reduced pressure to obtain a brown oily material. This was purified by column chromatography (silica gel, toluene) to obtain 183 g of 1-(3-hydroxy-1-heptynyl)-2,3,4-trifluorobenzene as a reddish brown oily material.

(4-4) Synthesis of 1-(3-hydroxyheptyl)-2,3,4-trifluorobenzene

In 730 mL of ethyl acetate, 183 g of 1-(3-hydroxy-1-heptynyl)-2,3,4-trifluorobenzene was dissolved, and 9 g of 5% palladium carbon (50% in water) was added. Then, the mixutre was stirred for 6 hours at a hydrogen pressure of 0.4 MPa. After the catalyst was removed by filtration (using cellulose), the solvent was evaporated under a reduced pressure to obtain 170 g of 1-(3-hydroxyheptyl)-2,3,4-trifluorobenzene as a light yellow solid.

(4-5) Synthesis of 2-butyl-7,8-difluorochroman

Under nitrogen replacement, 28.6 g of sodium hydride was suspended in 160 mL of THF and 160 mL of DMF. After a THF (160 mL) solution containing 170 g of 1-(3-hydroxyheptyl)-2,3,4-trifluorobenzene was slowly added dropwise, 160 mL of DMF was added, and heated to 55° C. After confirming that self-heating had started, the residual solution was added dropwise for 1 hour and stirred for 30 minutes at 50° C. The reaction solution was poured into water, to which concentrated hydrochloric acid was then added, and an organic layer was separated. After an aqueous layer was extracted with hexane, the extract was mixed with the organic layer, washed using water, a saturated sodium hydrogen carbonate aqueous solution, and a saturated saline solution in that order, and dried using anhydrous magnesium sulfate. The solvent was evaporated under a reduced pressure to obtain 170 g of a light brown oily material. This was purified by carrying out column chromatography (silica gel, hexane), distillation under a reduced pressure (70 to 126° C./3 mmHg), and column chromatography (silica gel, hexane) to obtain 85 g of 2-butyl-7,8-difluorochroman as an almost colorless oily material.

(4-6) Synthesis of 2-butyl-7,8-difluorochroman-2-ol

Under nitrogen replacement, 85 g of 2-butyl-7,8-difluorochroman was dissolved in 340 mL of THF. After cooling to −70° C., 236 mL of butyllithium (1.59 M in hexane) was added dropwise for 30 minutes, and stirred for 30 minutes at −50° C. to −60° C. To this, 43 g of trimethyl borate was added dropwise for 30 minutes, and warmed to 0° C. After 32 mL of acetic acid was added dropwise for 10 minutes, and stirred for 10 minutes, a 30% hydrogen peroxide aqueous solution was added dropwise for 30 minutes, and stirred for 1 hour. After 200 mL of water was added, and an organic layer was separated, an aqueous layer was extracted with ethyl acetate. The extract and the organic layer were mixed together, washed using water and a saturated saline solution in that order, and dried using anhydrous magnesium sulfate. The solvent was evaporated under a reduced pressure to obtain 101 g of a light yellow oily material. This was purified by column chromatography (silica gel, hexane→hexane/ethyl acetate) to obtain 40 g of 2-butyl-7,8-difluorochroman-2-ol as a light yellow oily material.

(4-7) Synthesis of 2-butyl-7,8-difluoro-6-(trans-4-pentylcyclohexylmethoxy)chroman (Ie)

To 20.5 g of 2-butyl-7,8-difluorochroman-2-ol which was dissolved in 70 mL of DMF, 25.1 g bromo-trans-4-pentyl-cyclohexylmethane and 11.7 g of anhydrous potassium carbonate were added, and heated to reflux for 1 hour. After the reaction solution was poured into 10% hydrochloric acid, and stirred for a while, the solution was extracted with toluene. An organic layer was washed using 10% hydrochloric acid twice, water, a 5% sodium hydroxide aqueous solution twice, water, a saturated sodium hydrogen carbonate aqueous solution twive, and a saturated saline solution in that order, and dried using anhydrous magnesium sulfate. The solvent was evaporated under a reduced pressure, and the obtained brown oily material was purified by carrying out column chromatography (silica gel, hexane), recrystallization (acetone/methanol), distillation under a reduced pressure (227° C./0.6 mmHg), column chromatography (silica gel, hexane/toluene), recrystallization (acetone/methanol), and recrystallization (acetone/methanol), to obtain 8.8 g of 2-butyl-7,8-difluoro-6-(trans-4-pentylcyclohexylmethoxy)chroman (Ie) as colorless crystals.

MS m/z: 408 (M$^+$), 55 (100) $^1$H-NMR (400 MHz, CDCl$_3$) δ(ppm): 0.88 (t, J=6.8 Hz, 3H), 0.93 (t, J=6.8 Hz, 3H), 0.9–2.1 (m, 26H), 2.6–2.8 (m, 2H), 3.73 (d, J=6.4 Hz, 2H), 3.9–4.0 (m, 1H), 6.38 (d, J=7.6 Hz, 1H)

Example 5

Synthesis of 2-butoxy-7,8-difluoro-6-(trans-4-(trans-4-ethylcyclohexyl) cyclohexylmethoxy)chroman (If)

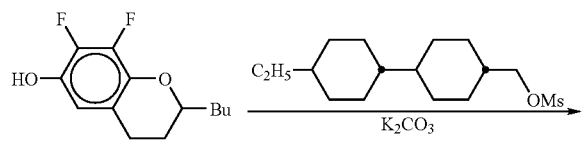

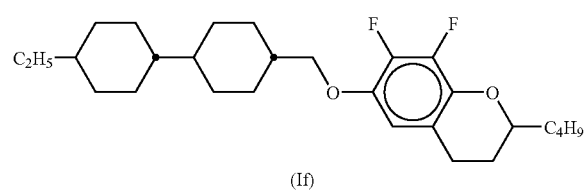

To 20.5 g of 2-butyl-7,8-difluorochroman-2-ol which was dissolved in 70 mL of DMF, 25 g of 4-(trans-4-ethylcyclohexyl)cyclohexylmethyl methanesulfonate and 11.4 g of anhydrous potassium carbonate were added, and heated to reflux for 3 hours. The reaction solution was poured into 10% hydrochloric acid, stirred for a while, and extracted with toluene. An organic layer was washed using 10% hydrochloric acid twive, water, a 5% sodium hydroxide aqueous solution twice, water, a saturated sodium hydrogen carbonate aqueous solution twice, and a saturated saline solution in that order, and dried using anhydrous magnesium sulfate. The solvent was evaporated under a reduced pressure, and the obtained brown solid material was purified by carrying out column chromatography (silica gel, hexane/toluene), recrystallization (hexane), recrystallization (acetone), and recrystallization (acetone), to obtain 14.7 g of 2-butoxy-7,8-difluoro-6-(trans-4-(trans-4-ethylcyclohexyl) cyclohexylmethoxy) chroman (If) as a colorless crystal.

MS m/z: 448 (M$^+$), 242 (100) $^1$H-NMR (400 MHz, CDCl$_3$) δ(ppm): 0.86 (t, J=7.2 Hz, 3H), 0.93 (t, J=6.8 Hz, 3H), 0.8–2.1 (m, 30H), 2.6–2.8 (m, 2H), 3.72 (d, J=6.4 Hz, 2H), 3.9–4.0 (m, 1H), 6.38 (d, J=8.0 Hz, 1H)

Example 6

Synthesis of 6-[2-(trans-4'-ethylbicyclohexyl-trans-4-yl)ethyl]-7,8-difluoro-2-pentylchroman

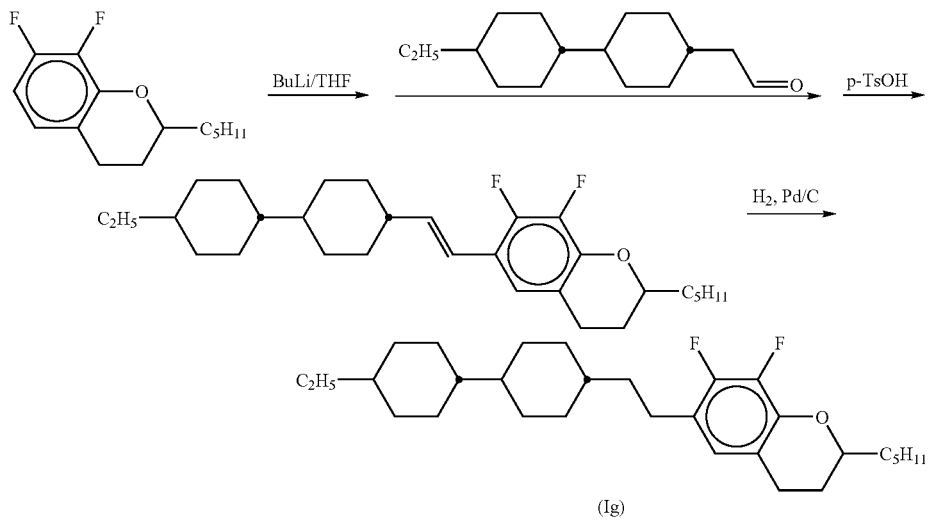

(6-1) Synthesis of 6-[2-(trans-4'-ethylbicyclohexyl-trans-4-yl)vinyl]-7,8-difluoro-2-pentylchroman A butyllithium/hexane solution (90 ml, 0.14 mol) was added dropwise into the THF (120 ml) solution containing 30 g of 7,8-difluoro-2-pentylchroman at −78° C. After stirring at −50° C. for 5 hours, the THF (70 ml) solution containing 35 g of trans-4-ethylbicyclohexyl-4-ylacetaldehyde was added dropwise. After warming to 0° C. over 2 hours, 3M hydrochloric acid was added. Then, this was extracted twice with ethyl acetate. The extract and the organic layer were mixed together, washed using a saturated sodium hydrogen carbonate aqueous solution and a saturated saline solution in that order, and dried using anhydrous sodium sulfate to obtain 77 g of a yellow solid. The crude product was used without purification for the following reaction.

To a toluene (150 ml) solution containing the crude product (77 g), 3.5 g of p-toluene sulfonate monohydrate was added. This was heated to reflux until no water was distilled from a water separator (approximately 3 hours). After the reaction solution had cooled, a saturated sodium hydrogen carbonate aqueous solution was added. An aqueous layer was extracted with toluene. The extract was washed with a saturated saline solution, and dried using anhydrous magnesium sulfate. This was concentrated to obtain a brown powder. This was purified by column chromatography (alumina, hexane) to obtain 55 g of 6-[2-(trans- 4'-ethylbicyclohexyl-trans-4-yl)vinyl]-7,8-difluoro-2-pentylchroman as a light yellow powder.

(6-1) Synthesis of 6-[2-(trans-4'-ethylbicyclohexyl-trans-4-yl)ethyl]-7,8-difluoro-2pentylchroman (Ig)

To the THF/ethanol solution (350 ml/350 ml) containing 75 g of 6-[2-(trans-4'-ethylbicyclohexyl-trans-4-yl)vinyl]-7,8-difluoro-2-pentylchroman, 3.5 g of 5% palladium carbon (50% in water) was added, and stirred at room temperature for 5 hours under a hydrogen pressure (0.5 MPa). After the reaction solution was filtered (using Celite), the solvent was evaporated, and the obtained light yellow powder was purified by carrying out column chromatography (silica gel, hexane) and recrystallization (acetone) twice, to obtain 30 g of 6-[2-(trans-4'-ethylbicyclohexyl-trans-4-yl)ethyl]-7,8-difluoro-2-pentylchroman (Ig) as a white powder.

MS m/z: 389 (M$^+$) $^1$H-NMR (400 MHz, CDCl$_3$) δ(ppm): 0.77–1.08 (m, 10H), 0.86 (t, J=7.2 Hz, 3H), 0.91(t, J=7.0 Hz, 3H), 1.14–1.22(m, 3H), 1.26 (s, 1H), 1.30–1.37 (m, 4H), 1.39–1.46 (m, 3H), 1.51–1.83 (m, 12H), 1.96–2.10 (m, 1H), 2.53 (t, J=7.8 Hz, 2H), 2.66–2.82 (m, 2H), 3.98–4.01 (m, 1H), 6.55 (d, J=6.8 Hz, 1H)

Example 7

Preparation of a Liquid Crystal Composition (2)

A liquid crystal composition (M-2) containing 90% of the host liquid crystal composition (H) prepared in Example 3 and 10% of the compound represented by formula (Ie) prepared in Example 4 was prepared. The physical values of this composition are as follows.

| | |
|---|---|
| Nematic Phase - Isotropic Liquid Phase Transition Temperature (T$_{N-I}$): | 93.4° C. |
| Dielectric Anisotropy (Δε): | −0.63 |
| Refractive Index Anisotropy (Δn): | 0.095 |

Example 8

Preparation of a Liquid Crystal Composition (3)

A liquid crystal composition (M-3) containing 90% of the host liquid crystal composition (H) prepared in Example 3 and 10% of the compound represented by formula (If) prepared in Example 5 was prepared. The physical values of this composition are as follows.

| | |
|---|---|
| Nematic Phase - Isotropic Liquid Phase Transition Temperature (T$_{N-I}$): | 104.2° C. |
| Dielectric Anisotropy (Δε): | −0.60 |
| Refractive Index Anisotropy (Δn): | 0.097 |

Example 9

Preparation of a Liquid Crystal Composition (4)

A liquid crystal composition (M-4) containing 90% of the host liquid crystal composition (H) prepared in Example 3 and 10% of the compound represented by formula (Ig) prepared in Example 6 was prepared. The physical values of this composition are as follows.

| | |
|---|---|
| Nematic Phase - Isotropic Liquid Phase Transition Temperature (T$_{N-I}$): | 104.8° C. |
| Dielectric Anisotropy (Δε): | −0.43 |
| Refractive Index Anisotropy (Δn): | 0.097 |

Example 10

Synthesis of 6-ethoxy-2-(trans-4-ethylcyclohexyl)-7,8-difluorochroman

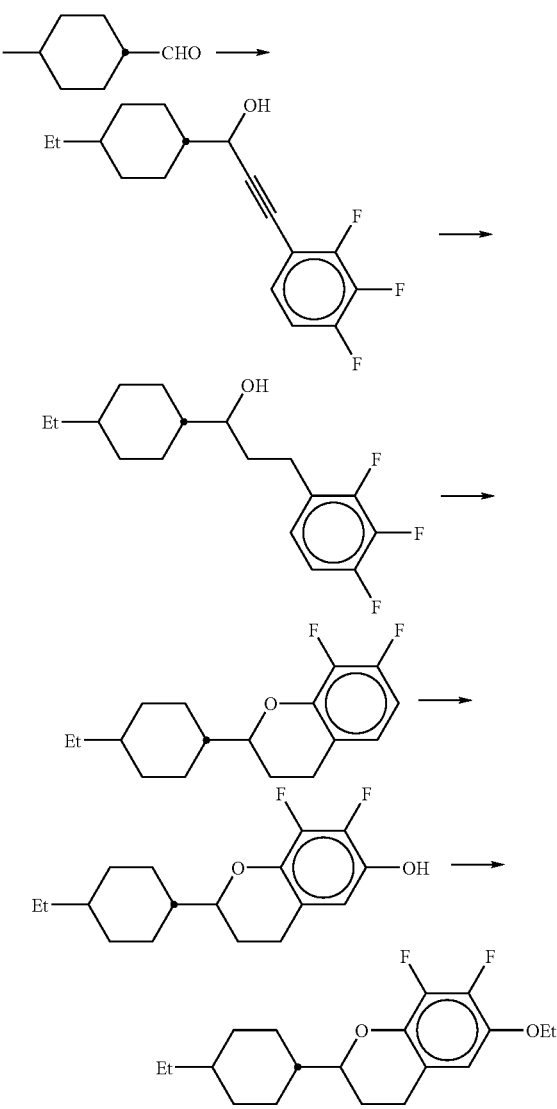

Into the tetrahydrofuran (THF) (100 ml) solution containing 2,3,4-trifluorophenylacetylene (20 g), the THF solution (93 ml) of 1.5 M bromide methyl magnesium was added dropwise at 0° C., and stirred for 1 hour. Into this, the THF (50 ml) solution of trans-4-ethylcyclohexane carboaldehyde (18 g) was added dropwise, and stirred for 1 hour. The reaction solution was poured into 5% hydrochloric acid, extracted with ethyl acetate, and concentrated. The residue was purified by silica gel column chromatography (hexane: ethyl acetate=9:1) to obtain 1-(trans-4-ethylcyclohexyl)-3-(2,3,4-trifluorophenyl)-2-propyne-1-ol (38 g).

A 200-ml ethyl acetate mixture containing 1-(trans-4-ethylcyclohexyl)-3-(2,3,4-trifluorophenyl)-2-propyne-1-ol (38 g) and 5% palladium carbon (50% in water, 2 g) was stirred for 4 hours at room temperature at a hydrogen pressure of 4 atm. After palladium carbon was removed by filtration using Celite, the filtrate was concentrated to obtain 1-(trans-4-ethylcyclohexyl)-3-(2,3,4-trifluorophenyl)-1-propanol (38 g).

Sodium hydride (40% in oil, 7 g) was washed with hexane, to which dimethylformamide (DMF) (200 ml) was added. Into this, the DMF (50 ml) solution of 1-(trans-4-ethylcyclohexyl)-3-(2,3,4-trifluorophenyl)-1-propanol (38 g) was added dropwise for 1 hour at 40° C., and stirred for 3 more hours. The reaction solution was poured into 5% hydrochloric acid, extracted with hexane, and concentrated. The residue was purified by silica gel column chromatography (hexane) to obtain 2-(trans-4-ethylcyclohexyl)-7,8-difluorochroman (28 g).

Into the THF (150 ml) solution of 2-(trans-4-ethylcyclohexyl)-7,8-difluorochroman (28 g), a 1.6 M butyllithium-hexane solution (65 ml) was added dropwise at −60° C., and stirred for 2 hours at −50° C. Into this, borate trimethyl (15 g) was added dropwise, stirred for 30 minutes, and warmed to 0° C. over 2 hours. Into this, acetic acid (10 ml) was added, and stirred for 20 minutes, to which 30% hydrogen peroxide aqueous solution (20 ml) was gradually added, and stirred for 1 hour. Into this, water (100 ml) was added, which was subjected to extraction using ethyl acetate, followed by concentration. The residue was purified by silica gel column chromatography (hexane:ethyl acetate=4:1) to obtain 2-(trans-4-ethylcyclohexyl)-7,8-difluoro-6-hydroxychroman (28 g).

The DMF (100 ml) suspension containing 2-(trans-4-ethylcyclohexyl)-7,8-difluoro-6-hydroxychroman (28 g), iodoethane (25 g), and anhydrous potassium carbonate (15 g) was heated to reflux for 2 hours. The reaction solution was poured into 5% hydrochloric acid, extracted with toluene, and concentrated. The residue was purified by silica gel column chromatography (hexane:ethyl acetate=9:1) to obtain 6-ethoxy-2-(trans-4-ethylcyclohexyl)-7,8-difluorochroman (30 g). Moreover, this was recrystallized using acetone to obtain 26 g of a pure substance.

Melting Point 90° C. $^1$H NMR(CDCl$_3$) δ 6.37 (dd, J=8.3 and 2.0 Hz, 1H), 3.99 (q, J=7.1 Hz, 2H), 3.70 (ddd, J=10.0, 6.5 and 2.2 Hz, 1H), 2.6–2.8 (m, 2H), 1.93–2.05 (m, 2H), 1.65–1.85 (m, 4H), 1.5–1.65 (m, 1H), 1.38 (t, J=7.1 Hz, 3H), 1.05–1.24 (m, 5H), 0.82–0.95 (m, 2H), 0.85 (t, J=7.6 Hz, 3H)

Example 11

Synthesis of 6-ethoxy-2-[trans-4-(trans-4-ethylcyclohexyl)cyclohexyl]-7,8-difluorochroman

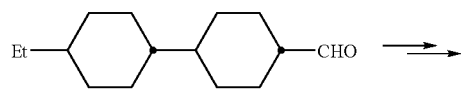

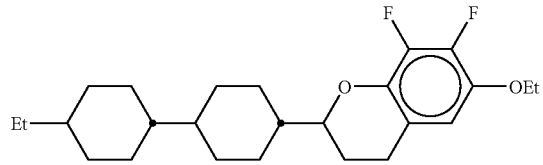

6-Ethoxy-2-[trans-4-(trans-4-ethylcyclohexyl)cyclohexyl]-7,8-difluorochroman was synthesized by using trans,trans-4'-ethylbicyclohexyl-4-carboaldehyde instead of trans-4-ethylcyclohexanecarboaldehyde in accordance with a method similar to the method for synthesis of 6-ethoxy-2-(trans-4-ethylcyclohexyl)-7,8-difluorochroman.

Phase Transition Temperature Cr, 147; N, 162; I, $^1$H NMR(CDCl$_3$) δ 6.37 (broad dd, J=8.3 and 1.7 Hz, 1H), 3.99 (q, J=7.1 Hz, 2H), 3.69 (ddd, J=9.8, 6.6 and 2.0 Hz, 1H), 2.6–2.8 (m, 2H), 1.9–2.1 (m, 2H), 1.65–1.85 (m, 6H), 1.48–1.60 (m, 1H), 1.37 (t, J=7.1 Hz, 3H), 0.75–1.25 (m, 15H), 0.84 (t, J=7.3 Hz, 3H)

Example 12

Synthesis of 6-ethoxy-7,8-difluoro-2-[2-(trans-4-propylcyclohexyl)ethyl]chroman

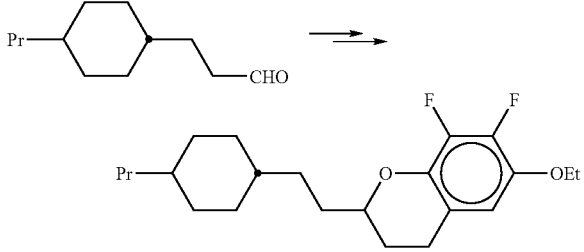

6-Ethoxy-7,8-difluoro-2-[2-(trans-4-propylcyclohexyl)ethyl]chroman was synthesized by using 3-(trans-4-propylcyclohexyl)propanal instead of trans-4-ethylcyclohexanecarboaldehyde in accordance with a method similar to the method for synthesis of 6-ethoxy-2-(trans-4-ethylcyclohexyl)-7,8-difluorochroman.

Melting Point 77° C. $^1$H NMR(CDCl$_3$) δ 6.38 (dd, J=8.4 and 2.0 Hz, 1H), 3.99 (q, J=7.1 Hz, 2H), 3.88–3.96 (m, 1H), 2.6–2.8 (m, 2H), 1.94–2.02 (m, 1H), 1.55–1.85 (m, 7H), 1.38 (t, J=7.1 Hz, 3H), 1.00–1.45 (m, 8H), 0.85 (t, J=7.3 Hz, 3H), 0.8–0.95 (m, 4H)

Example 13

Synthesis of 6-ethoxy-7,8-difluoro-2-[2-[trans-4-(trans-4-propylcyclohexyl)cyclohexyl]ethyl]chroman

-continued

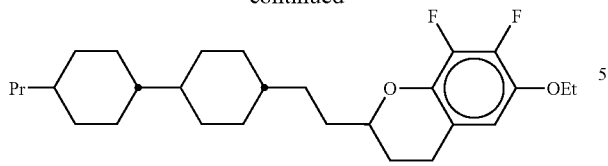

6-Ethoxy-7,8-difluoro-2-[2-[trans-4-(trans-4-propylcyclohexyl)cyclohexyl]ethyl]chroman was synthesized by using 3-(trans,trans-4'-propylbicyclohexane-4-yl)propanal instead of trans-4-ethylcyclohexane carboaldehyde in accordance with a method similar to the method for synthesis of 6-ethoxy-2-(trans-4-ethylcyclohexyl)-7,8-difluorochroman.

Phase Transition Temperature Cr, 126;N, 160;I, $^1$H NMR (CDCl$_3$) δ 6.37 (broad dd, J=8.3 and 1.8 Hz, 1H), 3.99 (q, J=6.9 Hz, 2H), 3.88–3.96 (m, 1H), 2.6–2.8 (m, 2H), 1.93–2.03 (m, 1H), 1.55–1.85 (m, 11H), 1.78 (t, J=6.9 Hz, 3H), 1.2–1.45 (m, 8H), 0.84 (t, J=7.3 Hz, 3H), 0.75–1.05 (m, 10H)

Example 14

Preparation of a Liquid Crystal Composition (5)

A liquid crystal composition (M-5) containing 90% of the host liquid crystal composition (H) prepared in Example 3 and 10% of the compound represented by formula (Ie) prepared in Example 4 was prepared. The physical values of this composition are as follows.

| | |
|---|---|
| Nematic Phase - Isotropic Liquid Phase Transition Temperature ($T_{N-I}$): | 93.4° C. |
| Dielectric Anisotropy (Δε): | −0.63 |
| Refractive Index Anisotropy (Δn): | 0.095 |

Example 15

Preparation of a Liquid Crystal Composition (6)

A liquid crystal composition (M-6) containing 90% of the host liquid crystal composition (H) prepared in Example 3 and 10% of the compound represented by formula (If) prepared in Example 5 was prepared. The physical values of this composition are as follows.

| | |
|---|---|
| Nematic Phase - Isotropic Liquid Phase Transition Temperature ($T_{N-I}$): | 104.2° C. |
| Dielectric Anisotropy (Δε): | −0.60 |
| Refractive Index Anisotropy (Δn): | 0.097 |

Example 16

Preparation of a Liquid Crystal Composition (7)

A liquid crystal composition (M-7) containing 90% of the host liquid crystal composition (H) prepared in Example 3 and 10% of the compound represented by formula (Ig) prepared in Example 6 was prepared. The physical values of this composition are as follows.

| | |
|---|---|
| Nematic Phase - Isotropic Liquid Phase Transition Temperature ($T_{N-I}$): | 104.8° C. |
| Dielectric Anisotropy (Δε): | −0.43 |
| Refractive Index Anisotropy (Δn): | 0.097 |

Example 17

Preparation of a Liquid Crystal Composition (8)

A liquid crystal composition (M-8) containing 90% of the host liquid crystal composition (H) prepared in Example 3 and 10% of the compound represented by formula (Ig) prepared in Example 6 was prepared. The physical values of this composition are as follows.

| | |
|---|---|
| Nematic Phase-Isotropic Liquid Phase Transition Temperature ($T_{N-I}$): | 104.8° C. |
| Dielectric Anisotropy (Δε): | −0.43 |
| Refractive Index Anisotropy (Δn): | 0.097 |

In the following table, the physical values of the liquid crystal compositios according to the present invention are shown.

TABLE 1

Physical Values of Compound

| Compound | $T_{N-I}$ (° C.) | Δε | Δn |
|---|---|---|---|
| Host Liquid Crystal Composition (H) | 103.2 | 0.03 | 0.099 |
| Example 1 (M-1) | 109.0 | −0.52 | 0.098 |
| Example 4 (M-2) | 93.4 | −0.63 | 0.095 |
| Example 5 (M-3) | 104.2 | −0.60 | 0.097 |
| Example 6 (M-4) | 104.8 | −0.44 | 0.097 |
| Example 10 (M-5) | 102.0 | −0.77 | 0.096 |
| Example 11 (M-6) | 103.4 | −0.71 | 0.098 |
| Example 12 (M-7) | 101.4 | −0.73 | 0.097 |
| Example 13 (M-8) | 103.5 | −0.57 | 0.098 |
| Comparative Example 1 (N-1) | 109.6 | −0.42 | 0.100 |
| Comparative Example 2 (N-2) | 109.4 | −0.22 | 0.099 |
| Comparative Example 3 (N-3) | 110.6 | −0.37 | 0.111 |

It is apparent from this table that the liquid crystal compositions (M-1) to (M-8) using the chroman-based compounds according to the present invention had a large absolute value of negative dielectric anisotropy as well as small refractive index anisotropy. On the other hand, the liquid crystal composition (N-1) of Comparative Example 1 having a 2,3-difluorophenylene group had a small absolute value of dielectric anisotropy and slightly small refractive index anisotropy. Moreover, the liquid crystal composition (N-2) of Comparative Example 2 using a 7,8-difluorotetralin-based compound had a small absolute value of dielectric anisotropy. Although the liquid crystal composition of Comparative Example 3 using the 1,7,8-trifluoronaphthalene based compound had a relatively large absolute value of dielectric anisotropy, the refractive index anisotropy thereof was significantly large.

Example 18

Preparation of a Liquid Crystal Composition (9)

A liquid crystal composition represented by the following formulae was prepared using plural compounds represented by general formula (1).

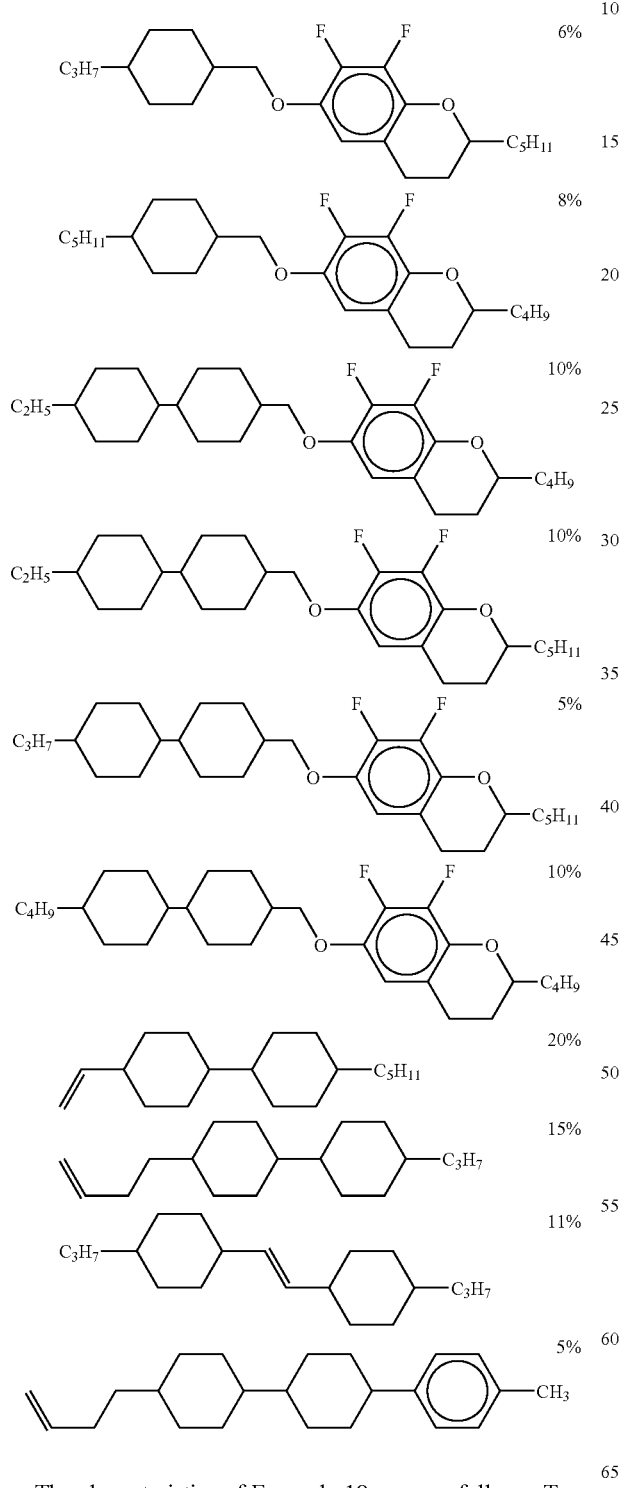

The characteristics of Example 18 were as follows: $T_{N-1}$ was 84° C., $\Delta n$ was 0.068, and $\Delta \epsilon$ was −3.2.

Moreover, as Comparative Example 4, a composition excluding compounds represented by general formula (1) was prepared.

(Comparative Example 4)

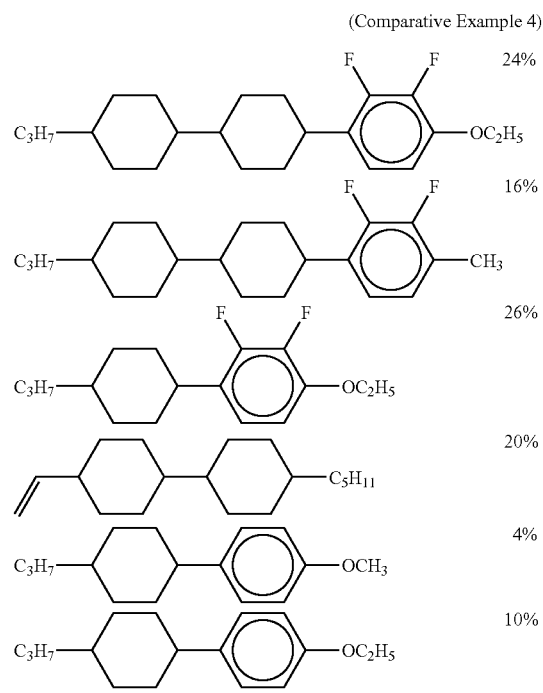

The characteristics of Comparative Example 4 were as follows: $T_{N-1}$ was 59° C., $\Delta n$ was 0.076, and $\Delta \epsilon$ was −2.8.

It is apparent that the liquid crystal composition of Example 18 had a small $\Delta n$ and large absolute value of negative $\Delta \epsilon$. A liquid crystal display element having excellent display quality was produced by using this liquid crystal composition.

Example 19

Preparation of a Liquid Crystal Composition (10)

A liquid crystal composition containing compounds represented by the following formulae was prepared.

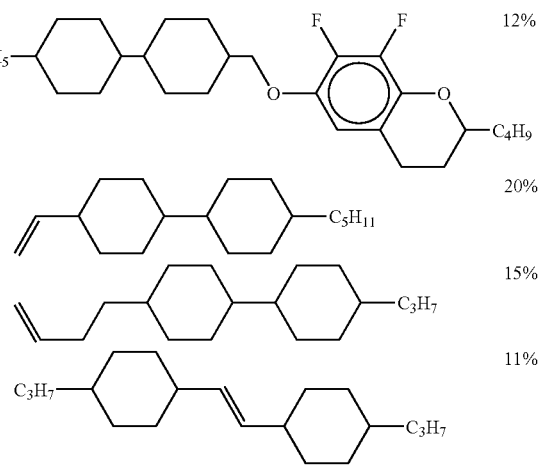

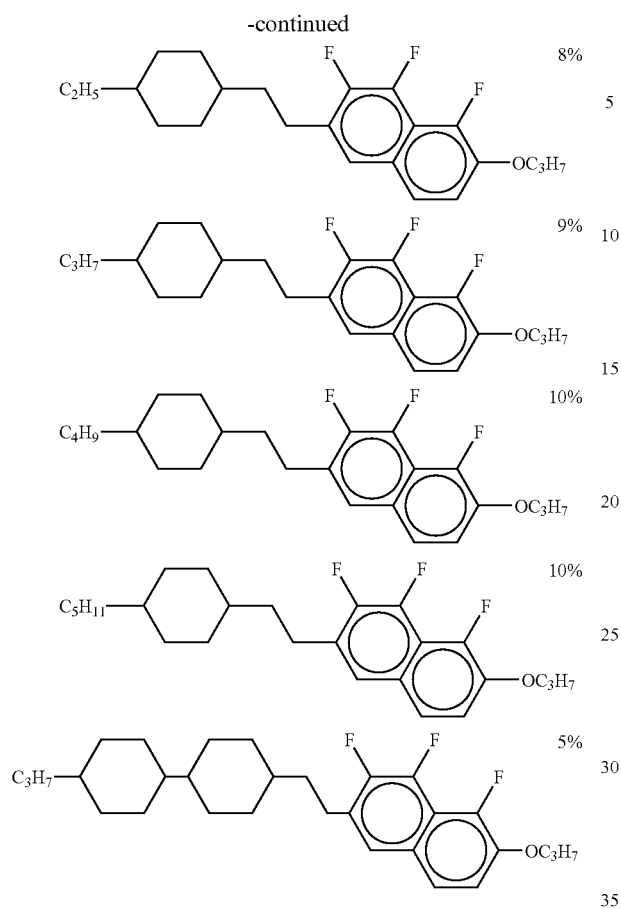

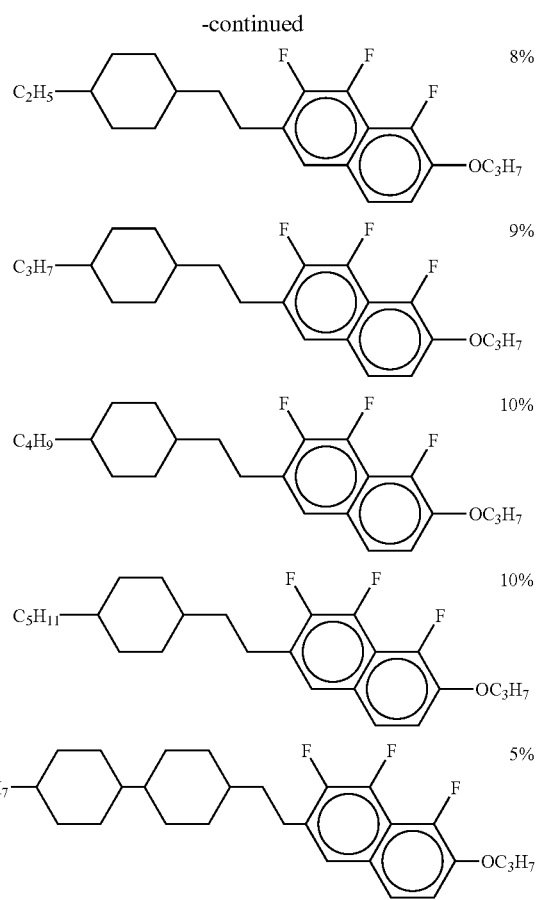

The characteristics of Example 19 were as follows: $T_{N-1}$ was 80° C., $\Delta n$ was 0.087, and $\Delta \epsilon$ was −4.0. A liquid crystal display element having excellent display quality was produced by using this liquid crystal composition.

Comparative Example 5

A composition of Comparative Example 5 was prepared by using a compound similar to the compound represented by general formula (1) included in the liquid crystal composition of Example 19.

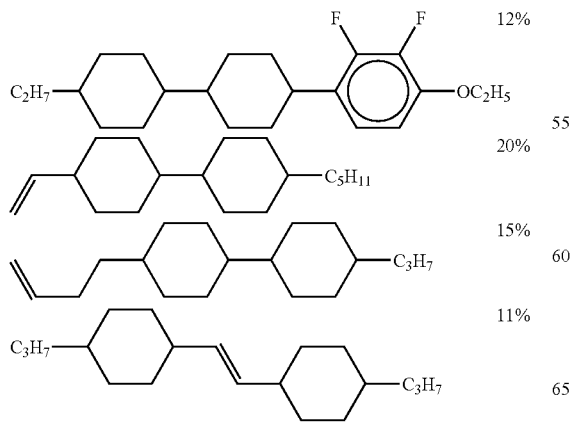

The characteristics of Comparative Example 5 were as follows: $T_{N-1}$ was 82° C., $\Delta n$ was 0.090, and $\Delta \epsilon$ was −3.7, and thus, in comparison with the liquid crystal composition of Example 19, $\Delta n$ increased and the absolute value of $\Delta \epsilon$ decreased.

Comparative Example 6

Moreover, a composition of Comparative Example 6 was prepared by using a compound having a tetrahydronaphthalene ring similar to the compound represented by general formula (1) included in the liquid crystal composition of Example 19.

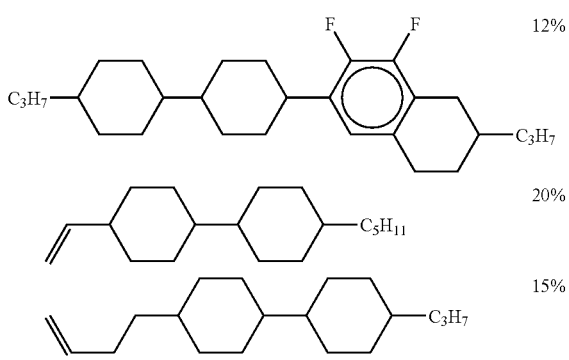

-continued

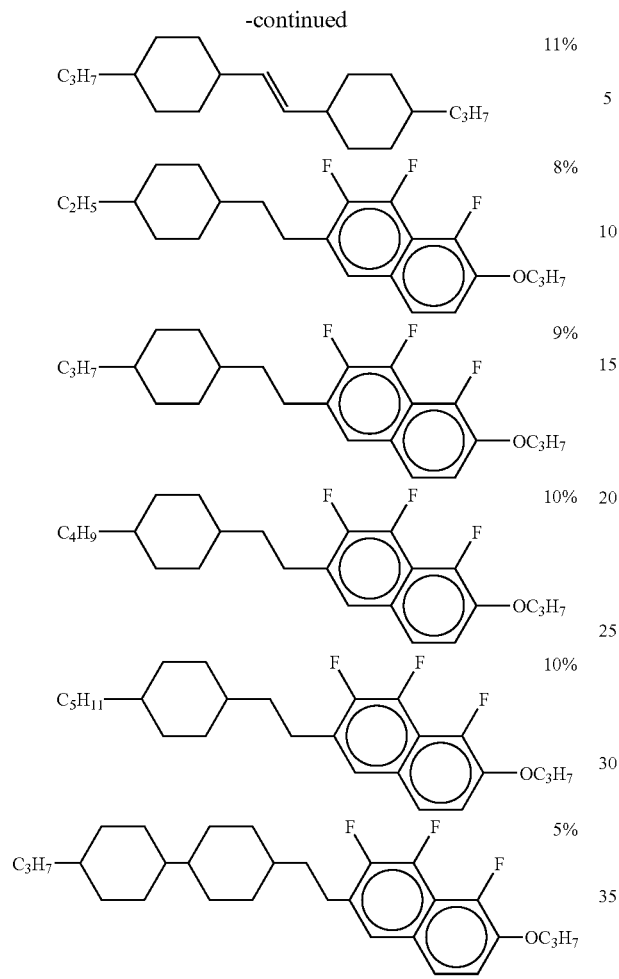

The characteristics of Comparative Example 6 were as follows: $T_{N-1}$ was 81° C., Δn was 0.089, and Δε was −3.1.

In the liquid crystal composition of Comparative Example 6, the absolute value of Δε further decreased.

Example 20

Preparation of a Liquid Crystal Composition (11)

A liquid crystal composition represented by the following formulae was prepared.

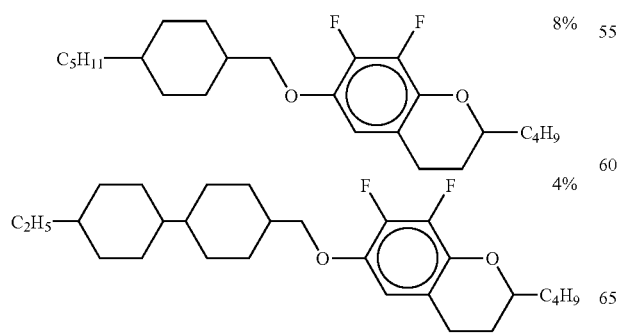

-continued

The characteristics of Example 20 were as follows: $T_{N-1}$ was 82° C., Δn was 0.081, and Δε was −3.3. A liquid crystal display element having excellent display quality was produced by using the liquid crystal composition.

Comparative Example 7

A composition of Comparative Example 7 was prepared by using a compound having a tetrahydronaphthalene ring similar to the compound represented by general formula (1) included in the liquid crystal composition of Example 20.

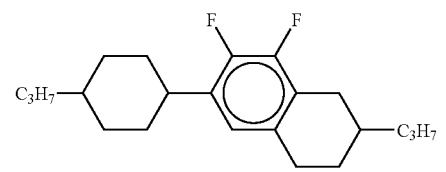 12%
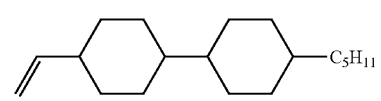 20%
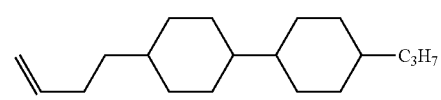 15%
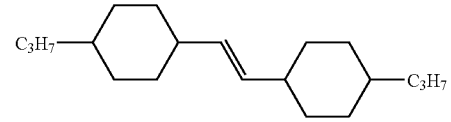 11%
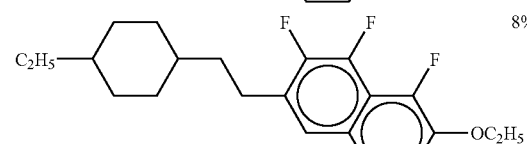 8%
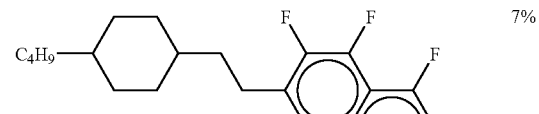 7%
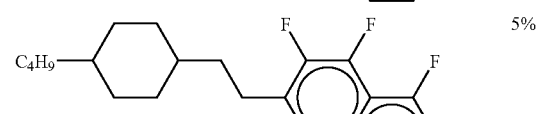 5%
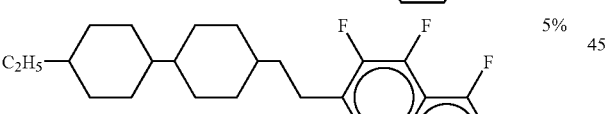 5%
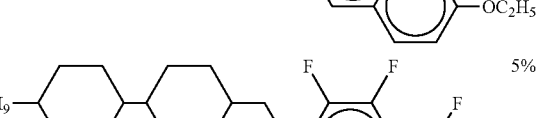 5%
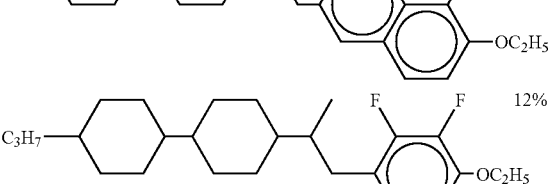 12%
The characteristics of Comparative Example 7 were as follows: $T_{N-1}$ was 79° C., Δn was 0.084, and Δε was −2.8.
It is apparent that in comparison with Example 20 the absolute value of Δε significantly decreased.
Example 21
Preparation of a Liquid Crystal Composition (12)
A liquid crystal composition represented by the following formulae was prepared.
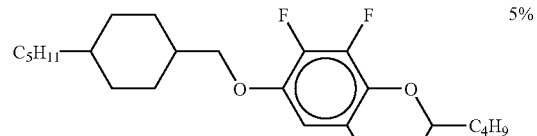 5%
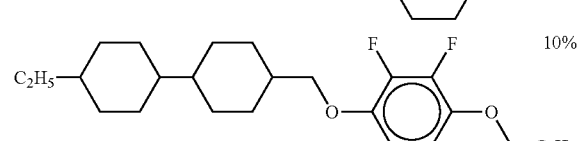 10%
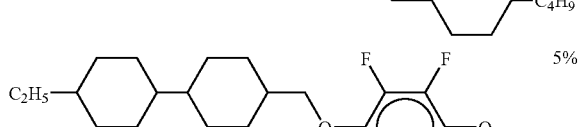 5%
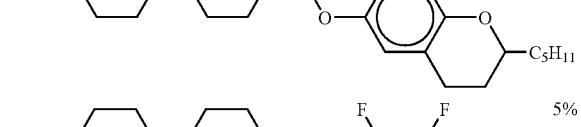 5%
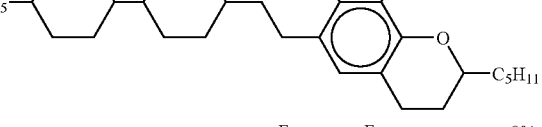 8%
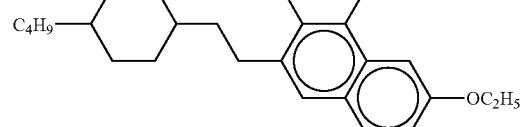 8%
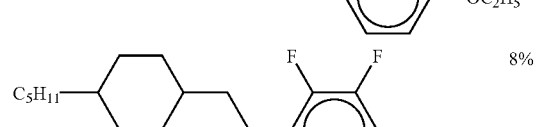 4%
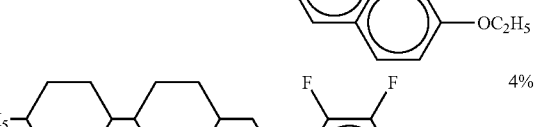 4%
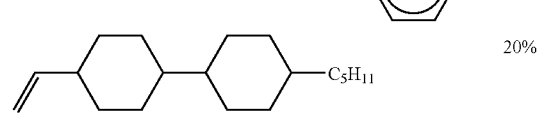 20%
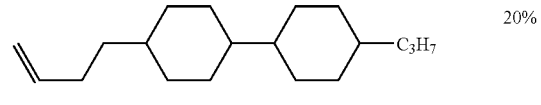 20%

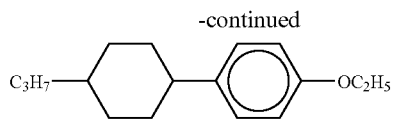

The characteristics of the liquid crystal composition of Example 21 were as follows: $T_{N-1}$ was 80° C., Δn was 0.081, and Δε was −3.3.

Example 22

Preparation of a Liquid Crystal Composition (13)

A liquid crystal composition represented by the following formulae was prepared.

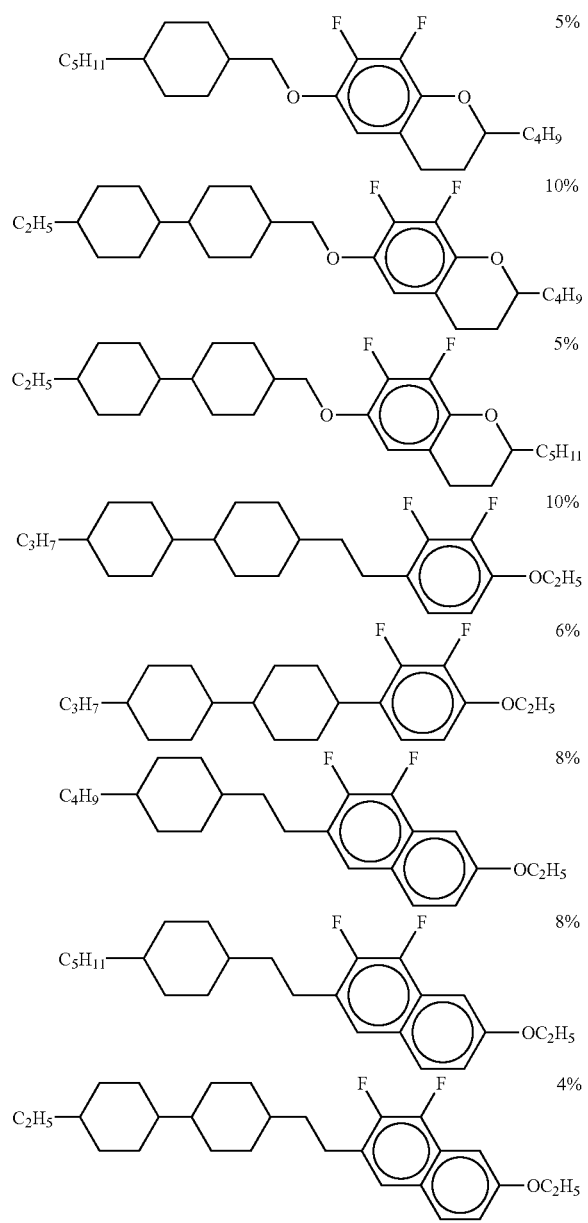

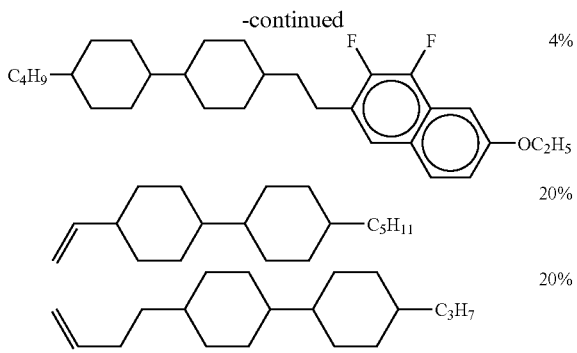

The characteristics of the composition of Example 22 were as follows: $T_{N-1}$ was 92° C., Δn was 0.083, and Δε was −3.7.

Liquid crystal display elements having excellent display quality were produced by using the liquid crystal compositions of Examples 19 to 22.

The invention claimed is:

1. A compound represented by general formula (1):

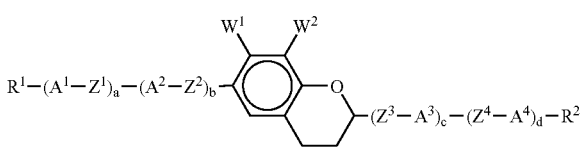

(wherein
R$^1$ and R$^2$ each independently represents hydrogen, an alkyl group having 1 to 12 carbon atoms or an alkenyl group having 2 to 12 carbon atoms, in which one CH$_2$ group or at least two CH$_2$ groups that are not adjacent to each other may be substituted by oxygen or sulfur, or in which at least one hydrogen may be substituted by fluorine or chlorine, A$^1$, A$^2$, A$^3$, and A$^4$ each independently represents a trans-1, 4-cyclohexylene group (in which one CH$_2$ group or two CH$_2$ groups that are not adjacent to each other may be substituted by oxygen or sulfur), a 1,4-phenylene group (in which at least one CH group may be substituted by nitrogen), a 1,4-cyclohexenylene group, a 1,4-bicyclo[2,2,2]octylene group, a piperidine-1,4-diyl group, a naphthalene-2,6-diyl group, a decahydronaphthalene-2,6-diyl group or a 1,2,3,4-tetrahydronaphthalene-2,6-diyl group, in which hydrogen may be substituted by —CN or halogen, Z$^1$, Z$^2$, Z$^3$, and Z$^4$ each independently represents —CH$_2$CH$_2$—, —CH=CH—, —CH(CH$_3$)CH$_2$—, —CH$_2$CH(CH$_3$)—, —CH(CH$_3$)CH(CH$_3$)—, —CF$_2$CF$_2$—, —CF=CF—, —CH$_2$O—, —OCH$_2$—, —OCH(CH$_3$)—, —CH(CH$_3$)O—, —(CH$_2$)$_4$—, —(CH$_2$)$_3$O—, —O(CH$_2$)$_3$—, —C≡C—, —CF$_2$O—, —OCF$_2$—, —COO—, —OCO—, —COS—, —SCO—, or a single bond, when A$^1$, A$^2$, A$^3$, A$^4$, Z$^1$, Z$^2$, Z$^3$, and Z$^4$ respectively exist in plural, they may be identical to each other or different from each other, a, b, c, and d each independently represents 0 or 1, and W$^1$ and W$^2$ each independently represents fluorine, chlorine, —CF$_3$, —CF$_2$H, —OCF$_3$, or —OCF$_2$H).

2. A liquid crystal display element:
having a structure comprising a pair of substrates, and the liquid crystal composition comprising the liquid crystal compound of claim 1 sandwiched between the substrates;
comprising at least an alignment control layer, a transparent electrode, and a polarizing plate.

3. A liquid crystal display element according to claim 2, wherein $W^1$ and $W^2$ represent fluorine.

4. A compound according to claim 1, wherein $R^1$ and $R^2$ each independently represents an alkyl group having 1 to 7 carbon atoms or an alkenyl group having 2 to 7 carbon atoms (in which one $CH_2$ group may be substituted by oxygen), and $W^1$ and $W^2$ represent fluorine in the general formula (1).

5. A compound according to claim 1, wherein $A^1$, $A^2$, $A^3$ and $A^4$ each independently represents a transl,4-cyclohexylene group, a 1,4-phenylene group which may be substituted by at least one fluorine, or a 1,4-bicyclo[2.2.2]octylene group in the general formula (1).

6. A compound according to claim 1, wherein $Z^1$, $Z^2$, $Z^3$, and $Z^4$ each independently represents —$CH_2CH_2$—, —CH=CH—, —$CF_2CF_2$—, —CF=CF—, —$CH_2O$—, —$OCH_2$—, —C≡C—, —$CF_2O$—, —$OCF_2$— or a single bond in the general formula (1).

7. A compound according to claim 1, wherein the sum of a, b, c, and d is 1 or 2 in the general formula (1).

8. A compound according to claim 1, wherein $R^1$ and $R^2$ each independently represents an alkyl group having 1 to 7 carbon atoms or an alkenyl group having 2 to 7 carbon atoms (in which a $CH_2$ group may be substituted by oxygen), $W^1$ and $W^2$ represent fluorine, $A^1$, $A^2$, $A^3$, and $A^4$ each independently represents a trans-1,4-cyclohexylene group, a 1,4-phenylene group which may be substituted by at least one fluorine, or a 1,4-bicyclo[2,2,2]octylene group, $Z^1$, $Z^2$, $Z^3$ and $Z^4$ each independently represents —$CH_2CH_2$—, —CH=CH—, —$CF_2CF_2$—, —CF=CF—, —$CH_2O$—, —$OCH_2$—, —C≡C—, —$CF_2O$—, —$OCF_2$—, or a single bond, and the sum of a, b, c, and d is 1 or 2 in the general formula (1).

9. A compound according to claim 1, wherein $R^1$ and $R^2$ each independently represents an alkyl group having 1 to 7 carbon atoms, an alkenyl group having 2 to 7 carbon atoms, or an alkoxyl group having 1 to 7 carbon atoms, $A^1$, $A^2$, $A^3$, and $A^4$ each independently represents a trans-1,4-cyclohexylene group, a 1,4-phenylene group, a 2-fluoro-1,4-phenylene group, a 3-fluoro-1,4-phenylene group, or a 2,3-difluoro-1,4-phenylene group, $Z^1$, $Z^2$, $Z^3$, and $Z^4$ each independently represents —$CH_2CH_2$—, —$CH_2O$—, —$OCH_2$ —, or a single bond, $W^1$ and $W^2$ represent fluorine, and the sum of a, b, c, and d is 1 or 2 in the general formula (1).

10. A compound according to claim 9, wherein $A^1$, $A^2$, $A^3$, and $A^4$ each independently represents a trans-1,4-cyclohexylene group or a 1,4-phenylene group in the general formula (1).

11. A liquid crystal composition comprising at least one liquid crystal compound according to claim 1.

12. A liquid crystal composition according to claim 11, further comprising at least one compound represented by general formula (2):

(wherein,
$R^3$ and $R^4$ each independently represents hydrogen, an alkyl group having 1 to 12 carbon atoms or an alkenyl group having 2 to 12 carbon atoms, in which one $CH_2$ group or at least two $CH_2$ groups that are not adjacent to each other may be substituted by oxygen or sulfur, or in which at least one hydrogen may be substituted by fluorine or chlorine, $B^1$ and $B^2$ each independently represents a trans-1,4-cyclohexylene group (in which one $CH_2$ group or two $CH_2$ groups that are not adjacent to each other may be substituted by oxygen or sulfur), a 1,4-phenylene group (in which at least one CH group may be substituted by nitrogen), a 1,4-cyclohexenylene group, a 1,4-bicyclo[2.2.2]octylene group, a piperidine-1,4-diyl group, a naphthalene-2,6-diyl group, a decahydronaphthalene-2,6-diyl group or a 1,2,3,4-tetrahydronaphthalene-2,6-diyl group, in which hydrogen may be substituted by —CN or halogen, $Y^1$ and $Y^2$ each independently represents —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO, —COS, —SCO—, or a single bond, when $Y^2$ and $B^2$ respectively exist in plural, they may be identical to each other or different from each other, and p represents 0, 1 or 2.

13. A liquid crystal display element having a structure comprising a pair of substrates and the liquid crystal composition according to claim 12.

14. A liquid crystal composition according to claim 11, further comprising at least one compound selected from the group consisting of compounds represented by general formula (3a), general formula (3b), and general formula (3c):

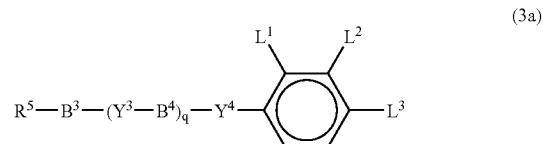

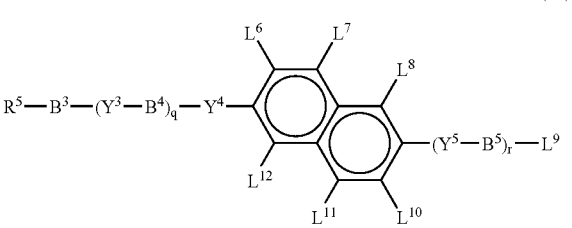

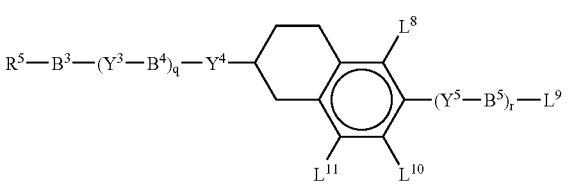

(wherein
$R^5$ represents hydrogen, an alkyl group having 1 to 12 carbon atoms or an alkenyl group having 2 to 12 carbon atoms, in which one $CH_2$ group or at least two $CH_2$ groups that are not adjacent to each other may be substituted by oxygen or sulfur, or in which at least one hydrogen may be substituted by fluorine or chlorine, $B^3$, $B^4$, and $B^5$ each independently represents a trans-1,4-cyclohexylene group (in which one $CH_2$ group or two $CH_2$ groups that are not adjacent to each other may be substituted by oxygen or sulfur), a 1,4-phenylene group (in which at least one CH group may be substituted by nitrogen), a 1,4-cyclohexenylene group, a 1,4-bicyclo[2.2.2]octylene group, a piperidine-1,4-diyl group, a naphthalene-2,6-diyl group, a decahydronaphthalene-2,6-diyl group or a 1,2,3,4-tetrahydronaphthalene-2,6-diyl group, in which hydrogen may be substituted by —CN or halogen, $Y^3$, $Y^4$, and $Y^5$ each independently represents —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO, —COS, —SCO—, or a single bond, $L^1$, $L^2$, $L^4$, $L^5$, $L^6$, $L^7$, $L^8$, $L^{10}$, $L^{11}$, and $L^{12}$ each independently represents hydrogen or fluorine, q and r each independently represents 0, 1, or 2, provided that the sum of q and r is no more than 2, and $L^3$ and $L^9$ each independently represents hydrogen, fluorine, chlorine, —CN, —$CF_3$, —$OCH_2$, —$OCHF_2$, —$OCF_3$, —$CH_2CF_3$, or the same meaning as $R^5$).

15. A liquid crystal composition according to claim 11, wherein a content ratio of the liquid crystal compound according to represented by general formula (1) is 2 to 30% by mass.

16. A liquid crystal composition according to claim 11, wherein the liquid crystal composition has a dielectric anisotropy value of no more than −0.2.

17. A liquid crystal display element according to claim 2, wherein the liquid crystal display element has an active matrix drive system.

18. A liquid crystal display element according to claim 2, wherein the liquid crystal display element has a liquid crystal alignment regulated by the alignment control layer to be vertical to a surface of the substrate.

* * * * *